United States Patent
Kikuchi et al.

(10) Patent No.: US 9,869,794 B2
(45) Date of Patent: Jan. 16, 2018

(54) MULTIPLE-OPTICAL-AXIS PHOTOELECTRIC SENSOR SYSTEM, MULTIPLE-OPTICAL-AXIS PHOTOELECTRIC SENSOR SYSTEM CONTROL METHOD, PROGRAM, AND RECORDING MEDIUM

(71) Applicant: OMRON CORPORATION, Kyoto (JP)

(72) Inventors: Keisaku Kikuchi, Kyoto (JP); Satoshi Nishiuchi, Kyoto (JP); Kazunori Okamoto, Kyoto (JP); Minoru Hashimoto, Kyto (JP); Kazunori Osako, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 343 days.

(21) Appl. No.: 14/625,989

(22) Filed: Feb. 19, 2015

(65) Prior Publication Data

US 2015/0260876 A1    Sep. 17, 2015

(30) Foreign Application Priority Data

Mar. 14, 2014  (JP) ................................. 2014-052150

(51) Int. Cl.
  *G01V 8/20*  (2006.01)
  *G01V 8/12*  (2006.01)
(52) U.S. Cl.
  CPC .  *G01V 8/20* (2013.01); *G01V 8/12* (2013.01)
(58) Field of Classification Search
  CPC .... G01V 8/12; G01V 8/20; G01V 8/10; F16P 1/00; F16P 3/00; G01S 17/026;
  (Continued)

(56) References Cited

U.S. PATENT DOCUMENTS 6,979,814 B2  12/2005  Kudo et al.
8,947,652 B2   2/2015  Ohmae et al.
(Continued)

FOREIGN PATENT DOCUMENTS

EP     2474960       7/2012
JP   2003-218679     7/2003
(Continued)

OTHER PUBLICATIONS

U.S. Appl. No. 14/625,745 to Keisaku Kikuchi et al., filed Feb. 19, 2015.
(Continued)

*Primary Examiner* — Que T Le
*Assistant Examiner* — Jennifer Bennett
(74) *Attorney, Agent, or Firm* — Greenblum & Bernstein, P.L.C.

(57) ABSTRACT

A start-up time of a production facility is shortened while generation of a muting error is suppressed, whereby productivity is improved. A multiple-optical-axis photoelectric sensor system includes a projector, an optical receiver, a light blocking determination unit configured to make a light blocking determination whether each of optical axes formed between the projector and the optical receiver is in a light blocking state, and a muting processor configured to temporarily disable the light blocking determination on condition that a detection signal input from an external muting instrument changes according to a predetermined sequence. The muting processor determines the sequence of the detection signal from the muting instrument during the muting by dividing the sequence into a plurality stages. The muting processor accumulates and analyzes measurement information acquired in each stage, and decides an optimum setting value for a muting operation condition based on an analysis result.

16 Claims, 12 Drawing Sheets

(58) Field of Classification Search
CPC .... G08B 13/183; G08B 21/02; G08B 13/181; G08B 21/00; G01J 1/32; G01J 1/10; G01J 1/18; G01J 1/20; H03K 2217/94114; H03K 2217/94104
See application file for complete search history.

(56) References Cited

U.S. PATENT DOCUMENTS

| | | | |
|---|---|---|---|
| 9,171,438 B2* | 10/2015 | Kikuchi | ............... G01V 8/20 |
| 2003/0146373 A1 | 8/2003 | Kudo et al. | |
| 2014/0001345 A1 | 1/2014 | Tsuzuki et al. | |
| 2014/0002264 A1 | 1/2014 | Kikuchi et al. | |
| 2014/0028436 A1 | 1/2014 | Osako et al. | |
| 2014/0131555 A1 | 5/2014 | Iida et al. | |

FOREIGN PATENT DOCUMENTS

| | | | |
|---|---|---|---|
| JP | 2006-317237 | 11/2006 | |
| JP | 2007-222979 | 9/2007 | |
| JP | 2009-515265 | 4/2009 | |
| JP | 2009-225012 | 10/2009 | |
| JP | 2010-38588 | 2/2010 | |
| JP | 2010-178235 | 8/2010 | |
| JP | WO 2012081265 A1 * | 6/2012 | ............... G01V 8/20 |
| JP | 2012-134575 | 7/2012 | |
| JP | 5229310 | 7/2013 | |

OTHER PUBLICATIONS

Korean Office Action in KR 10-2015-0028823, with English language translation, dated Oct. 2, 2015.
Extended European Search Report in EP 15155867.3, dated Dec. 2, 2015.
Notification of Reasons for Refusal in JP Application No. 2014-052150 with English language translation, dated Sep. 21, 2017.

* cited by examiner

FIG. 11

| No | Data content |
|---|---|
| 1 | Time until workpiece is detected using MUTE B since workpiece is detected using MUTE A |
| 2 | Time until multiple-optical-axis photoelectric sensor detects workpiece since workpiece is detected using MUTE B |
| 3 | Time until workpiece is not detected using MUTE B since multiple-optical-axis photoelectric sensor does not detect workpiece |
| 4 | Time until workpiece is not detected using MUTE A since workpiece is not detected using MUTE B |
| 5 | Time during which multiple-optical-axis photoelectric sensor continuously detects workpiece |
| 6 | Number of sensor located at lowermost position in sensors actually detecting workpiece during detection of workpiece when multiple-optical-axis photoelectric sensors coupled to one another are used |
| 7 | Number of optical axis located at lowermost position in optical axes actually detecting workpiece during detection of workpiece in multiple-optical-axis photoelectric sensor |
| 8 | Number of sensor located at uppermost position in sensors actually detecting workpiece during detection of workpiece when multiple-optical-axis photoelectric sensors coupled to one another are used |
| 9 | Number of optical axis located at uppermost position in optical axes actually detecting workpiece during detection of workpiece in multiple-optical-axis photoelectric sensor |

The number of
workpieces (piece)

0    T2    Time

The number of
workpieces (piece)

0    T2    Time

The number of
workpieces (piece)

T1min    T1max    Time

MULTIPLE-OPTICAL-AXIS PHOTOELECTRIC SENSOR SYSTEM, MULTIPLE-OPTICAL-AXIS PHOTOELECTRIC SENSOR SYSTEM CONTROL METHOD, PROGRAM, AND RECORDING MEDIUM

CROSS-REFERENCE TO RELATED APPLICATION

This application is based on Japanese Patent Application No. 2014-052150 filed with the Japan Patent Office on Mar. 14, 2014, the entire contents of which are incorporated herein by reference.

FIELD

The present invention relates to a multiple-optical-axis photoelectric sensor system, a multiple-optical-axis photoelectric sensor system control method, a program, and a recording medium in which the program is recorded. Particularly, the present invention relates to a multiple-optical-axis photoelectric sensor system provided with a function of muting a multiple-optical-axis photoelectric sensor.

BACKGROUND

A general multiple-optical-axis photoelectric sensor includes a light projecting unit in which a plurality of light projecting elements are arranged in line and a light receiving unit in which light receiving elements as many as the light projecting elements are arranged in line. The light projecting elements and the light receiving elements are arranged so as to face to each other on a one-on-one basis, and a detection area composed of a plurality of optical axes is set.

The light projecting unit causes the light projecting elements to sequentially emit the light beam. The light receiving unit takes out the amount of light that each light receiving element receives from a corresponding light projecting element in synchronization with a light emitting operation of the light projecting element. Therefore, a light blocking state is sequentially detected in each optical axis of the multiple-optical-axis photoelectric sensor. The light receiving unit determines whether an object exists in a detection area using a detection result of each optical axis, and outputs a signal indicating a determination result. The light projecting unit and the light receiving unit are connected through a communication line in order to synchronize the light projecting unit and the light receiving unit with each other. Alternatively, the light projecting unit and the light receiving unit are synchronized with each other by optical communication between the light projecting unit and the light receiving unit.

For example, the multiple-optical-axis photoelectric sensor is installed as a device securing safety of a worker in a production site. For example, operation of a production facility is stopped when the light blocking state is detected in one of the optical axes in the detection area of the multiple-optical-axis photoelectric sensor. Depending on a production apparatus, it is necessary to provide the detection area of the multiple-optical-axis photoelectric sensor in a passage through which a pre-processing or post-processing workpiece is conveyed. However, productivity is degraded in the case that the workpiece blocks the optical axis to stop the production facility.

A muting function of temporarily disabling a safety function of the multiple-optical-axis photoelectric sensor exists as a function of establishing the safety and the productivity in the production site. Basically, the muting function disables the whole detection area based on two independent muting signals output from a sensor or a switch. The whole detection area is disabled only in a period during which the muting signal is output from the sensor or switch according to a correct sequence or maintained (for example, see Japanese Patent No. 5229310).

Because the muting signal is used as a trigger disabling the safety function of the multiple-optical-axis photoelectric sensor, the sequence (specifically, output order and output time of two muting signals) of the muting signal is strictly checked. When the sequence deviates from a previously-defined condition, generally a determination of a danger state is made to cut off power supplied to the production facility.

In the muting function, for example, a proximity switch or a limit switch is used as the sensor or switch that outputs the muting signal. The sensor or the switch is installed on the passage through which the workpiece is conveyed, and the sensor or the switch detects the workpiece to output the muting signal. The sequence in the muting function is defined based on a position where the sensor or switch is installed, a shape of the workpiece, and a conveying speed of the workpiece. Therefore, in the case that the deviation is generated at the position where the sensor or switch is installed, the muting signal is not output according to the predetermined sequence. As a result, the productivity is disturbed because the production facility is stopped. A phenomenon in which, although the workpiece of the muting target passes, the muting function is abnormally operated to stop the production facility is called a "muting error". The muting error is possibly generated by the shape of the workpiece and a vibration of the passage during the conveyance of the workpiece in addition to the installation state of the sensor.

As to a countermeasure suppressing the muting error, in the conventional multiple-optical-axis photoelectric sensor, after the multiple-optical-axis photoelectric sensor and a muting sensor are installed, a test run in which the workpiece is conveyed on a trial basis is repeated, and the installation states of the sequence and the muting sensor are narrowed in order to normally operate the muting function. For this reason, a large amount of man-hour is required during start-up of the production facility. Additionally, every time the workpiece is switched (exchange of arrangement) in the production facility, it is necessary to narrow the installation states of the sequence and the muting sensor in order to meet the shape and conveying speed of the post-switch workpiece, which results in a problem in that the man-hour becomes huge.

In order to solve the problem, Japanese Patent No. 5229310 discloses a multiple-optical-axis photoelectric sensor having a function of dividing the sequence into a plurality of stages to monitor the sequence and making a notification regarding in which stage the muting error is generated in order to be restored from the muting error. However, although this technique contributes to the shortening of the restoration time after the muting error is generated, the technique insufficiently exerts the effect with respect to the suppression of the generation of the muting error and the shortening of the start-up time of the production facility.

SUMMARY

An object of the present invention is to shorten the start-up time of the production facility while the generation of the muting error is suppressed in the multiple-optical-axis photoelectric sensor system, whereby the productivity is improved.

According to one aspect of the present invention, a multiple-optical-axis photoelectric sensor system configured to detect a detection object conveyed by a conveying device is provided. The multiple-optical-axis photoelectric sensor system includes: a projector including a plurality of light projecting units arrayed in line; an optical receiver including a plurality of light receiving units that are arranged so as to face the plurality of respective light projecting units; a light blocking determination unit configured to make a light blocking determination whether each of a plurality of optical axes formed between the plurality of light projecting units and the plurality of light receiving units is in a light blocking state; and a muting processor configured to temporarily disable the light blocking determination on condition that a detection signal input from an external muting instrument changes according to a predetermined sequence. The muting processor includes: a muting start determination unit configured to start muting based on an output from the muting instrument; and a muting determination unit configured to determine the sequence of the detection signal from the muting instrument during the muting by dividing the sequence into a plurality of stages. The muting determination unit accumulates measurement information acquired in each stage, and analyzes the accumulated measurement information. The muting processor decides an optimum setting value for a muting operation condition based on an analysis result of the muting determination unit.

Preferably the muting determination unit is configured to accumulate the analysis result together with the measurement information, and updates the accumulated measurement information and analysis result at predetermined timing.

Preferably the muting determination unit is configured to accumulate the optimum setting value together with the measurement information and the analysis result, and backs up the analysis result and the optimum setting value in units of detection objects.

Preferably the multiple-optical-axis photoelectric sensor system further includes an input unit configured to receive a setting input from a user. The input unit receives a setting concerning the measurement information accumulated in the muting determination unit.

Preferably the input unit receives a setting concerning an analysis technique or an analysis condition in the muting determination unit.

Preferably the input unit receives a setting concerning a condition that is used when the muting processor decides the optimum setting value.

Preferably the plurality of projectors are coupled to each other in a direction perpendicular to the optical axis, and the plurality of optical receivers are coupled to each other in the direction perpendicular to the optical axis so as to face the plurality of projectors. The input unit receives selection of at least one set of the projector and the optical receiver as a target of the muting determination unit.

Preferably the multiple-optical-axis photoelectric sensor system further includes a presentation unit configured to present the analysis result or the optimum setting value to the user.

Preferably the muting processor automatically reflects the optimum setting value in the sequence.

Preferably the muting processor is configured to switch and use the plurality of sequences according to a shape of a detection object. The muting determination unit accumulates and analyzes the measurement information in each detection object.

Preferably the multiple-optical-axis photoelectric sensor system further includes an input unit configured to receive a setting input from a user; and a presentation unit configured to present the analysis result or the optimum setting value to the user. The input unit receives a setting concerning a type of the detection object presented by the presentation unit.

Preferably the multiple-optical-axis photoelectric sensor system further includes an information unit configured to detect an abnormality in the measurement information accumulated in the muting determination unit and inform the user of the abnormality.

According to another aspect of the present invention, a method for controlling a multiple-optical-axis photoelectric sensor system configured to detect a detection object conveyed by a conveying device is provided. The multiple-optical-axis photoelectric sensor system includes: a projector including a plurality of light projecting units arrayed in line; and an optical receiver including a plurality of light receiving units that are arranged so as to face the plurality of respective light projecting units. The method includes the steps of: making a light blocking determination whether each of a plurality of optical axes formed between the plurality of light projecting units and the plurality of light receiving units is in a light blocking state; and performing muting in order to temporarily disable the light blocking determination on condition that a detection signal input from an external muting instrument changes according to a predetermined sequence. The muting performing step includes the steps of: starting the muting based on an output from the muting instrument; determining the sequence of the detection signal from the muting instrument during the muting by dividing the sequence into a plurality of stages, accumulating measurement information acquired in each stage, and analyzing the accumulated measurement information; and deciding an optimum setting value for a muting operation condition based on an analysis result of the measurement information.

According to still another aspect of the present invention, a program for controlling a multiple-optical-axis photoelectric sensor system configured to detect a detection object conveyed by a conveying device is provided. The multiple-optical-axis photoelectric sensor system includes: a projector including a plurality of light projecting units arrayed in line; and an optical receiver including a plurality of light receiving units that are arranged so as to face the plurality of respective light projecting units. The program causes a processor to execute the steps of: making a light blocking determination whether each of a plurality of optical axes formed between the plurality of light projecting units and the plurality of light receiving units is in a light blocking state; and performing muting in order to temporarily disable the light blocking determination on condition that a detection signal input from an external muting instrument changes according to a predetermined sequence. In the muting performing step, the program causes the processor to execute the steps of: starting the muting based on an output from the muting instrument; determining the sequence of the detection signal from the muting instrument during the muting by dividing the sequence into a plurality of stages; accumulating measurement information acquired in each stage, and analyzing the accumulated measurement information; and deciding an optimum setting value for a muting operation condition based on an analysis result of the measurement information.

According to yet another aspect of the present invention, a processor-readable recording medium in which a program for controlling a multiple-optical-axis photoelectric sensor system configured to detect a detection object conveyed by a conveying device is recorded is provided. The multiple-optical-axis photoelectric sensor system includes: a projector including a plurality of light projecting units arrayed in line; and an optical receiver including a plurality of light receiving units that are arranged so as to face the plurality of respective light projecting units. The program causes a processor to execute the steps of: making a light blocking determination whether each of a plurality of optical axes formed between the plurality of light projecting units and the plurality of light receiving units is in a light blocking state; and performing muting in order to temporarily disable the light blocking determination on condition that a detection signal input from an external muting instrument changes according to a predetermined sequence. In the muting performing step, the program causes the processor to execute the steps of: starting the muting based on an output from the muting instrument; determining the sequence of the detection signal from the muting instrument during the muting by dividing the sequence into a plurality of stages; accumulating measurement information acquired in each stage, and analyzing the accumulated measurement information; and deciding an optimum setting value for a muting operation condition based on an analysis result of the measurement information.

According to the present invention, the statistical information on the muting function is presented to the user, so that the user can set the muting sequence based on the high-accuracy information. Therefore, the stop of the production facility due to the generation of the muting error can be suppressed. Additionally, the necessity of the trial and error is eliminated in start-up of the production facility, so that man-hour of start-up work can be reduced. As a result, the productivity can be improved.

BRIEF DESCRIPTION OF THE DRAWINGS

FIG. 11 is a view illustrating an example of data accumulated through muting sequence executing processing in FIG. 10;

DETAILED DESCRIPTION

Figure 1:
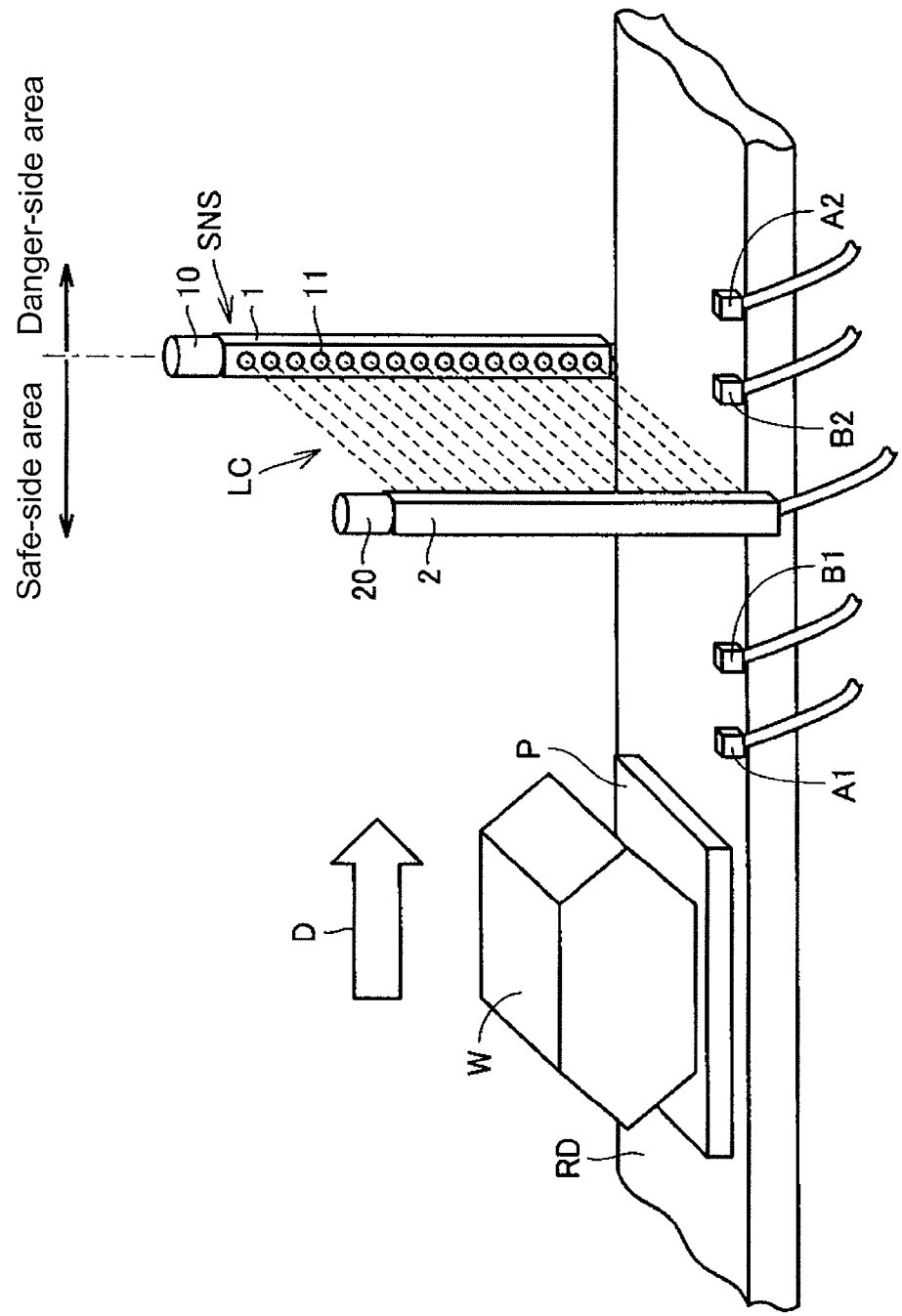
FIG. 1 is a view schematically illustrating a configuration example of a multiple-optical-axis photoelectric sensor system according to an embodiment of the present invention.

Hereinafter, an exemplary embodiment of the present invention will be described in detail with reference to the drawings. In the drawings, the identical or equivalent component is designated by the identical numeral. In the following description, unless otherwise noted, a dotted line indicating a traveling direction of a light beam and the light beam are expressed by an "optical axis".

FIG. 1 is a view schematically illustrating a configuration example of a multiple-optical-axis photoelectric sensor system according to an embodiment of the present invention. Referring to FIG. 1, in the multiple-optical-axis photoelectric sensor system of the embodiment, a sensor device is made as a multiple-optical-axis photoelectric sensor SNS. A workpiece W (detection target object) is conveyed through a passage RD by a conveying device (not illustrated). The multiple-optical-axis photoelectric sensor SNS includes a projector 1 and an optical receiver 2. The projector 1 and an optical receiver 2 are disposed so as to face each other across the passage RD through which the workpiece W is conveyed. By way of example, the passage RD is configured by a belt conveyer.

In FIG. 1, an arrow D indicates a direction in which the workpiece W is conveyed. In the example of FIG. 1, the workpiece W is conveyed while placed on a pallet P.

The projector 1 includes a plurality of light emitting elements 11 (light projecting unit). The optical receiver 2 includes a plurality of light receiving elements 21 (see FIG. 4), and the light receiving elements 21 are the light receiving unit that are arranged so as to face the light emitting elements 11. The optical receiver 2 includes the light receiving elements 21 as many as the light emitting elements 11. The plurality of light emitting elements 11 and the plurality of light receiving elements 21 are aligned with each other on a one-on-one basis. Accordingly, a two-dimensional detection area LC composed of a plurality of optical axes is set.

In the example of FIG. 1, in the direction in which the workpiece W is conveyed, an upstream side of the detection area LC is set to a "safe-side area" and a downstream side of the detection area LC is set to a "danger-side area". However, the "safe-side area" and the "danger-side area" are not limited to the embodiment. For example, in the direction in which the workpiece W is conveyed, the upstream side of the detection area LC may be set to the "danger-side area" and the downstream side of the detection area LC may be set to the "safe-side area".

Muting sensors A1 and B1 are provided in the safe-side area. Muting sensors B2 and A2 are provided in the danger-side area. In the example of FIG. 1, the muting sensor A1 is disposed on the upstream side of the muting sensor B1 in the direction in which the workpiece W is conveyed. On the other hand, the muting sensor A2 is disposed on the downstream side of the muting sensor B2 in the direction in which the workpiece W is conveyed. Therefore, in the case that an object invades in an opposite direction to the direction indicated by the arrow D, the multiple-optical-axis photoelectric sensor SNS can correctly detect the invasion of the object.

For example, the muting sensors A1, A2, B1, and B2 are transmission type photoelectric sensors. In this case, each of the muting sensors A1, A2, B1, and B2 is constructed with a light projecting device and a light receiving device, which face each other across the passage RD. Accordingly, although not illustrated in FIG. 1, each of the muting sensors A1, A2, B1, and B2 includes the light projecting device or light receiving device on the opposite side across the passage RD.

A type of the muting sensor is not limited to the transmission type photoelectric sensors. A reflection type photoelectric sensor or a proximity sensor may be used according to a material of the workpiece W. Alternatively, an instrument except the sensor having a function of detecting the object may be used.

A detection signal is output from the multiple-optical-axis photoelectric sensor SNS to a power supply circuit (not illustrated) of a machine (for example, a production facility) installed in the danger-side area. In the case that the light beam is not blocked in the detection area LC, the multiple-optical-axis photoelectric sensor SNS outputs a signal indicating a "non-detection" state. By way of example, the multiple-optical-axis photoelectric sensor SNS outputs an H (logical high)-level signal. In the case that at least a part of the light beams is blocked in the detection area LC, the multiple-optical-axis photoelectric sensor SNS stops the output. In other words, the detection signal is switched from the "non-detection" state to a "detection" state. By way of example, the detection signal is switched from the H-level to an L (logical low)-level.

Indicating lamps 10 and 20 informing a user of muting are disposed on tops of chassis of the projector 1 and optical receiver 2. The indicating lamps 10 and 20 are lit during the muting. In the case that an abnormality is generated, the indicating lamps 10 and 20 inform the user of the abnormality generation by blinking. The abnormality concerning the muting is sometimes generated not only during the muting but also before the muting. For example, the "abnormality" includes an inadequate setting of the sensor and the abnormality (muting error) generated by a change in speed or attitude of the workpiece W in addition to the abnormality generated by an object (for example, a human body) except the registered workpiece W.

In the embodiment, the multiple-optical-axis photoelectric sensor SNS is set to a muting state while the workpiece W passes through the detection area LC. Therefore, the multiple-optical-axis photoelectric sensor SNS does not stop the output while the workpiece W passes through the detection area LC.

Figure 2:
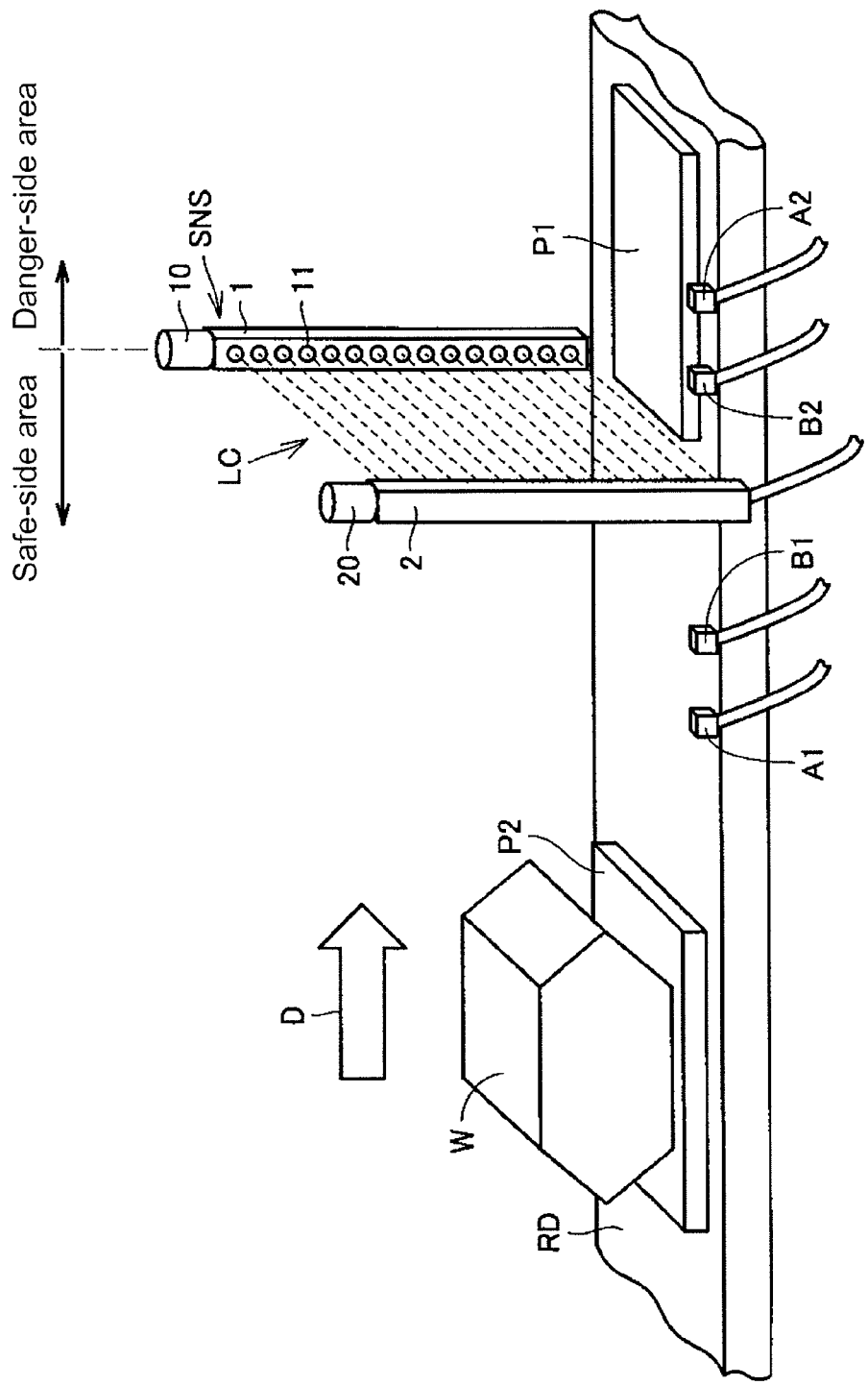
FIG. 2 is a view illustrating an example in which the height of a workpiece changes in the configuration of FIG. 1.

In the example of FIG. 1, the direction in which the optical axes are arrayed is a height direction of the workpiece W. Nowadays, with diversification of production facilities, sometimes mixed workpieces having various shapes are conveyed on the passage RD. FIG. 2 is a view illustrating an example in which the height of the workpiece changes in the configuration of FIG. 1. Referring to FIG. 2, the workpiece is not placed on a pallet P1. On the other hand, the workpiece W is placed on a pallet P2. The pallet P1 passing through the detection area differs from the pallet P2 (and workpiece W) passing through the detection area LC in the height of the workpiece.

Figure 3:
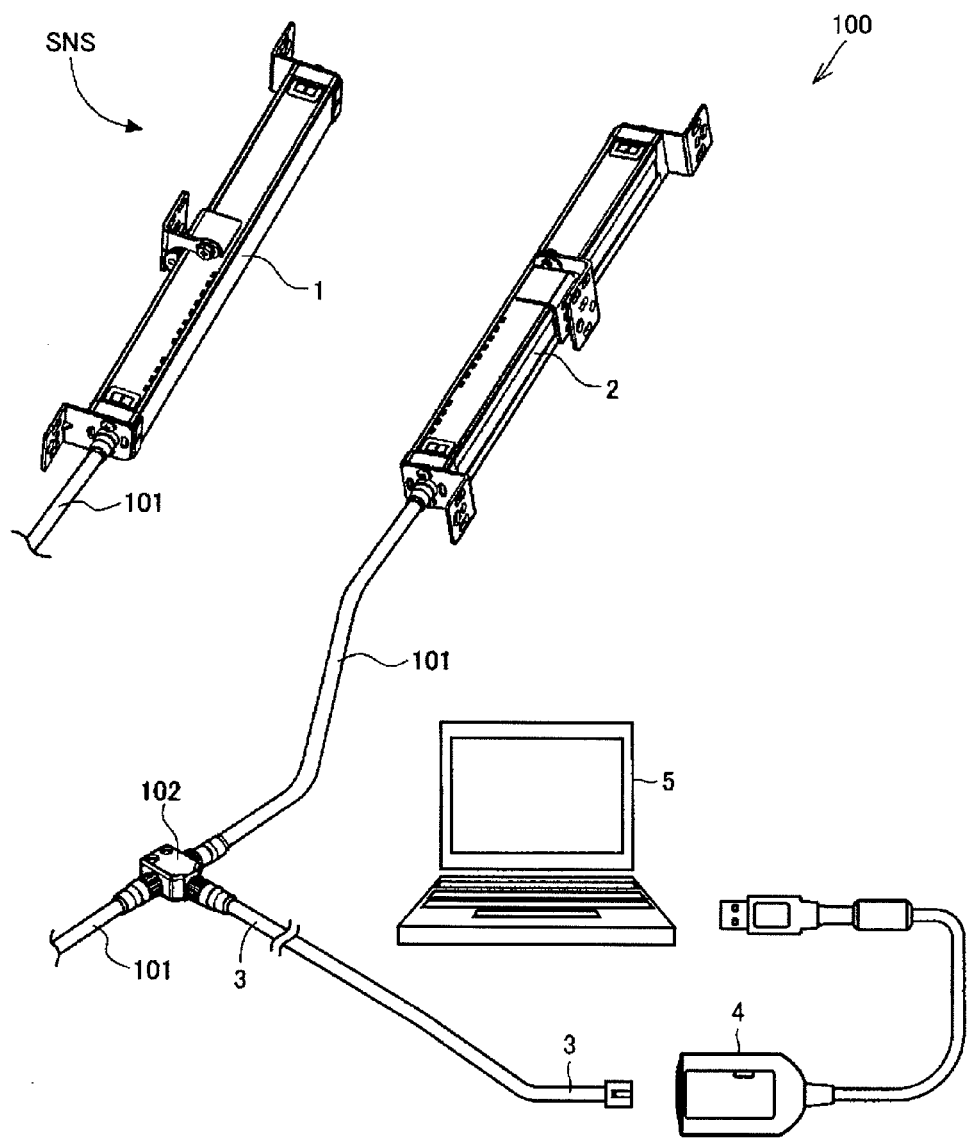
FIG. 3 is an outline view illustrating a configuration example of the multiple-optical-axis photoelectric sensor system of the embodiment.

FIG. 3 is an outline view illustrating a configuration example of the multiple-optical-axis photoelectric sensor system of the embodiment. Referring to FIG. 3, the multiple-optical-axis photoelectric sensor SNS includes the projector 1, the optical receiver 2, and a communication unit 4. A multiple-optical-axis photoelectric sensor system 100 includes the multiple-optical-axis photoelectric sensor SNS and a personal computer 5.

The multiple-optical-axis photoelectric sensor SNS includes the projector 1, the optical receiver 2, and a communication cable 101. The projector 1 and the optical receiver 2 are connected by the communication cable 101. A communication unit 4 is coupled to the communication cable 101 through a branch connector 102 and a dedicated cord 3. The communication unit 4 is connected to the branch connector 102 and the personal computer 5.

Figure 4:
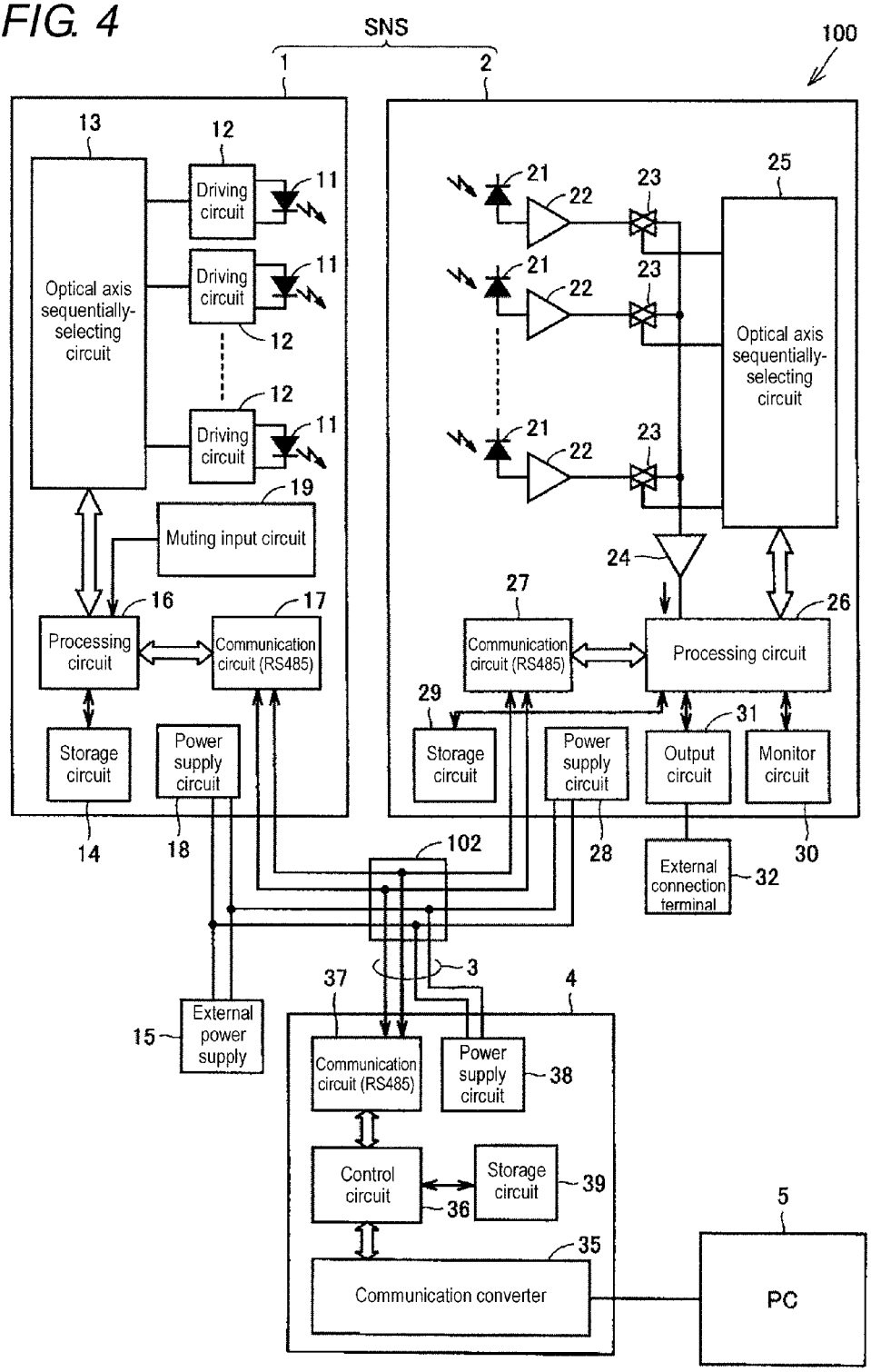
FIG. 4 is a block diagram illustrating a configuration of the multiple-optical-axis photoelectric sensor in FIG. 3.

FIG. 4 is a block diagram illustrating a configuration of the multiple-optical-axis photoelectric sensor SNS in FIG. 3. Referring to FIG. 4, the projector 1 includes the light emitting elements 11. The projector 1 also includes driving circuits 12 each of which individually drives a corresponding light emitting element 11, an optical axis sequentially-selecting circuit 13, a processing circuit 16, a communication circuit 17, a power supply circuit 18, a muting input circuit 19, and a storage circuit 14.

The optical receiver 2 includes a plurality of light receiving elements 21 each of which is provided corresponding to the light emitting element 11. The optical receiver 2 also includes amplifiers 22 each of which is provided corresponding to the light receiving element 21, switches 23 each of which is provided corresponding to the light receiving element 21, an optical axis sequentially-selecting circuit 25, a processing circuit 26, an amplifier 24 that input a signal to the processing circuit 26, a communication circuit 27, a power supply circuit 28, a storage circuit 29, a monitor circuit 30, and an output circuit 31.

The optical axis sequentially-selecting circuit 13 sequentially connects the driving circuits 12 of the light emitting elements 11 to the processing circuit 16. The optical axis sequentially-selecting circuit 25 sequentially connects the amplifier 22 and switch 23 corresponding to each light receiving element 21 to the processing circuit 26.

Each of the processing circuits 16 and 26 are constructed with a microcomputer including a CPU and a memory. Each of the processing circuits 16 and 26 compares a light receiving quantity at every time to a predetermined threshold to determine whether each optical axis is in a light incidence or light blocking state. Additionally, every time the selection of the optical axes makes one round, each of the processing circuits 16 and 26 integrates determination results of the optical axes to determine, as to the whole detection area LC, whether the light beam is blocked. The communication circuits 17 and 27 are communication interfaces pursuant to an RS485 standard, and control signal exchange between the projector 1 and the optical receiver 2.

Programs and parameters, which are necessary for operations of the processing circuits 16 and 26, are stored in the storage circuits 14 and 29 in the identical chassis, respectively. Areas where data collected in data accumulating and analyzing processing (to be described) is accumulated are provided in the storage circuits 14 and 29.

The output circuit 31 is connected to a switch mechanism (not illustrated), which is incorporated in a power supply circuit supplying power to a machine in a danger area, through an external connection terminal 32. When an output signal from the output circuit 31 is in the "non-detection" state (by way of example, the H-level), the switch mechanism is closed to supply the power to the machine in the danger area. On the other hand, when the output signal from the output circuit 31 is in the "detection" state (by way of example, the L-level), the switch mechanism is opened to stop the machine. The monitor circuit 30 controls lighting of each of the indicating lamps 10 and 20.

The power supply circuits 18 and 28 receive the power from a common external power supply 15 (DC power supply), and the power supply circuits 18 and 28 supply the power to the projector 1 and the optical receiver 2, respectively.

The branch connector 102 branches a communication line and a power line between the projector 1 and the optical receiver 2. The branched communication line and power line are accommodated in the dedicated cord 3. The communication unit 4 is connected to the dedicated cord 3. The communication unit 4 is connected to the personal computer (indicated as PC in FIG. 4) 5.

The communication unit 4 includes a control circuit 36, a communication circuit 37, a power supply circuit 38, a communication converter 35, and a storage circuit 39. The communication circuit 37 is an interface pursuant to the RS485 standard. The power supply circuit 38 fetches the power from the external power supply 15 through the branch connector 102, and supplies the power to each unit in the communication unit 4. The communication converter 35 performs serial conversion of the signal pursuant to the RS485 standard, and outputs a signal pursuant to a standard such as RS232C and USB (Universal Serial Bus). A program and a parameter, which are necessary for operation of the control circuit 36, are stored in the storage circuit 39. An area where the data collected in the data accumulating and analyzing processing (to be described) and an analysis result of the data are accumulated is provided in the storage circuit 39.

The optical axis sequentially-selecting circuit 13 and the optical axis sequentially-selecting circuit 25 are synchronized with each other, the light emitting elements 11 are sequentially lit, and the light receiving elements 21 sequentially output light receiving signals. The processing circuits 16 and 26 synchronize signals controlling the operations of the light emitting element 11 and light receiving element 21 with each other using the communication circuits 17 and 27.

As described above, the projector 1 and the optical receiver 2 are synchronized with each other using communication through the communication cable 101. Alternatively, the projector 1 and the optical receiver 2 may be synchronized with each other using optical communication.

Figure 5:
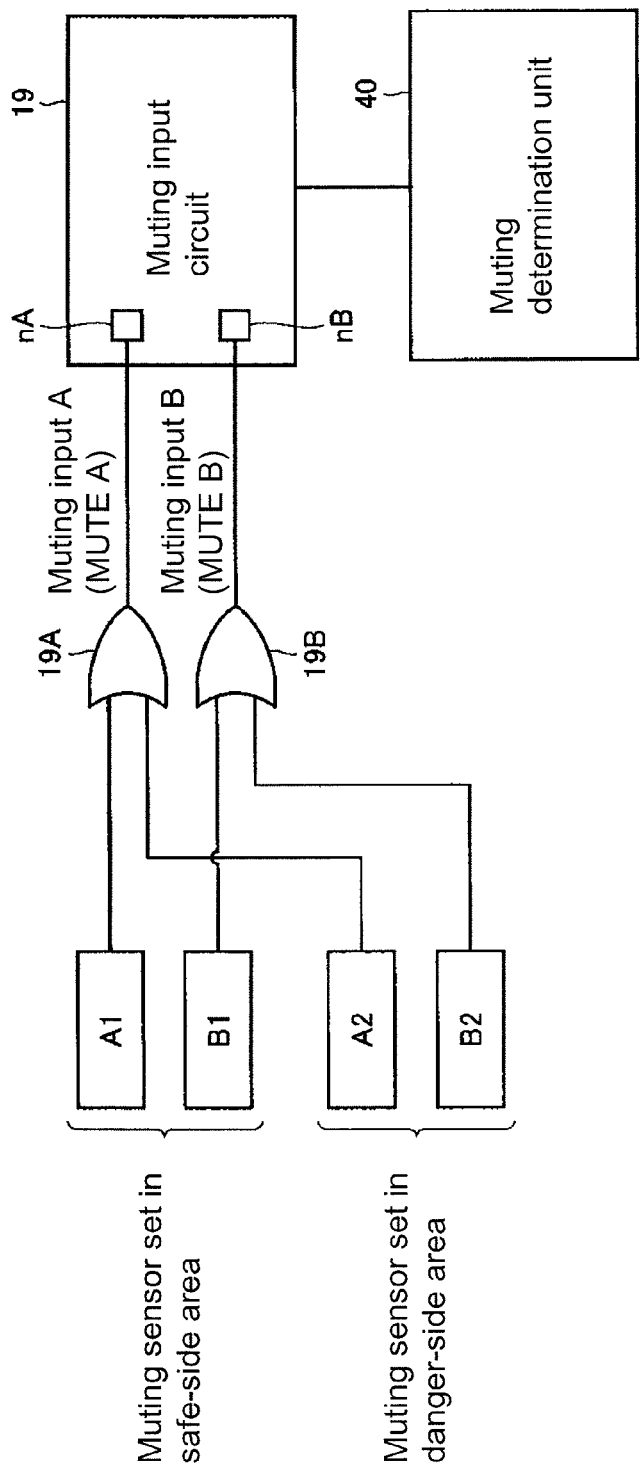
FIG. 5 is a circuit diagram illustrating connection between muting sensors and a muting input circuit.

The muting input circuit 19 receives detection signals from the muting sensors A1, B1, A2, and B2 (see FIG. 1). FIG. 5 is a circuit diagram illustrating connection between the muting sensors and the muting input circuit. As illustrated in FIG. 5, the muting input circuit 19 includes input ports nA and nB.

An OR circuit 19A receives the output signals from the muting sensors A1 and A2. The muting sensors A1 and A2 output the H-level signal when the workpiece W is detected, and the muting sensors A1 and A2 output the L-level signal when the workpiece W is not detected. The OR circuit 19A generates OR of the two signals, and outputs a signal to the input port nA.

An OR circuit 19B receives the output signals from the muting sensors B1 and B2. The muting sensors B1 and B2 output the H-level signal when the workpiece W is detected, and the muting sensors B1 and B2 output the L-level signal when the workpiece W is not detected. The OR circuit 19B generates OR of the two signals, and outputs a signal to the input port nB.

Hereinafter, the signals input from the muting sensors A1 and A2 to the muting input circuit 19 through the OR circuit 19A and the input port nA are referred to as "MUTE A (muting input A)". On the other hand, the signals input from the muting sensors B1 and B2 to the muting input circuit 19 through the OR circuit 19B and the input port nB are referred to as "MUTE B (muting input B)".

The muting input circuit 19 transmits the MUTE A and the MUTE B to a muting determination unit 40. The muting determination unit 40 generates a trigger signal for starting muting processing based on the MUTE A and MUTE B input from the muting input circuit 19. The muting determination unit 40 provides the generated trigger signal to a muting processor. As described later, the muting processor performs the muting processing of disabling the detection signal (light blocking determination) of the multiple-optical-axis photoelectric sensor SNS based on the trigger signal. The muting determination unit 40 also monitors sequences of the MUTE A and MUTE B from the muting input circuit 19 by dividing the sequences into a plurality of stages, and determines whether the MUTE A and the MUTE B are changed according to predetermined sequences in each stage.

Referring to FIG. 4, the personal computer 5 displays the data received through, for example, the communication unit 4. The personal computer 5 may display various parameters set in the multiple-optical-axis photoelectric sensor SNS. In addition to or instead of the personal computer 5, another display device (for example, a dedicated console) that displays various pieces of information may be connected to the communication unit 4.

Figure 6:
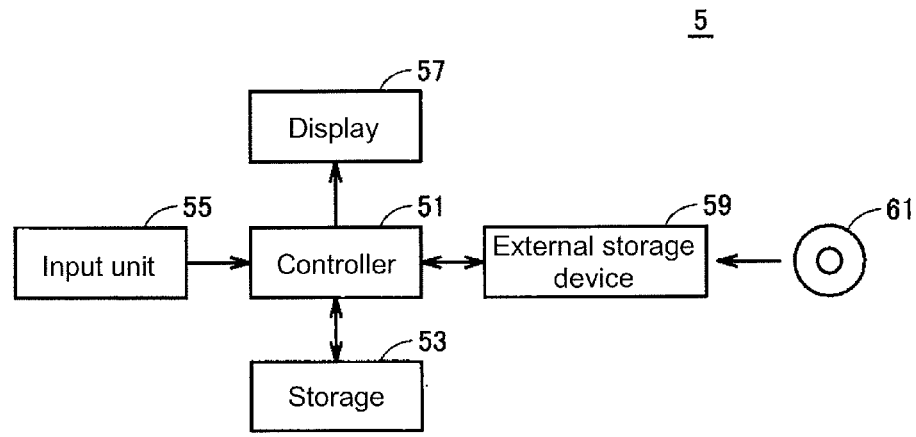
FIG. 6 is a view illustrating a configuration of a personal computer in FIG. 4.

FIG. 6 is a view illustrating a configuration of the personal computer 5 in FIG. 4. Referring to FIG. 6, the personal computer 5 includes a controller 51 that controls the whole personal computer 5, an input unit 55 that receives input of data, a storage 53 in which the data is temporarily stored, a display 57 that outputs the data, and an external storage device 59 in which a program executed by the controller 51 is stored in a non-volatile manner.

The controller 51 includes a CPU, a ROM (Read Only Memory) in which a program executed by the CPU is stored, and a RAM (Random Access Memory) in which a variable necessary for the CPU to execute the program and the like are stored.

The input unit 55 is a keyboard or a mouse, and a character, a digit, and a predetermined command can be input to the input unit 55. The input unit 55 receives data transmitted from the communication unit 4.

Various pieces of data necessary for the setting of the multiple-optical-axis photoelectric sensor SNS are temporarily stored in the storage 53.

For example, the display 57 is a liquid crystal display device that displays various pieces of information in response to an instruction of the controller 51. The information displayed on the display 57 includes an operation result of the multiple-optical-axis photoelectric sensor SNS, data accumulated during the performance of muting sequence executing processing (to be described), and an analysis result of the data.

The external storage device 59 reads the program and data that are recorded in a processor-readable recording medium 61, and transmits the program and data to the controller 51. Examples of the processor-readable recording medium 61 include tape systems such as a magnetic tape and a cassette tape, disk systems such as a magnetic disk (for example, a flexible disk and a hard disk drive) and an optical disk (for example, a CD-ROM and a DVD), card systems such as an IC card (including a memory card) and an optical card, and semiconductor memories such as a mask ROM, an EPROM, and a flash memory, in which the program is fixedly stored. The program may be downloaded through a network (not illustrated). The controller 51 reads the program recorded in the recording medium 61 using the external storage device 59, which allows the controller 51 to execute the read program.

For example, a program causing the personal computer 5 (processor) to perform each step included in a method for controlling the multiple-optical-axis photoelectric sensor system of the embodiment is included in the program recorded in the recording medium 61. However, the device in which the program causing the personal computer 5 (processor) to perform each step included in the multiple-optical-axis photoelectric sensor system controlling method is recorded is not limited to the recording medium 61. For example, the program may be recorded in one of the storage circuit 14 of the projector 1, the storage circuit 29 of the optical receiver 2, and the storage circuit 39 of the communication unit 4. The processor performing each step included in the multiple-optical-axis photoelectric sensor system controlling method is not limited to the computer such as the personal computer 5. For example, a mobile terminal having a connecting function to the network (not illustrated) may perform each step included in the multiple-optical-axis photoelectric sensor system controlling method.

In the embodiment, the data can be output to an outside of the multiple-optical-axis photoelectric sensor system 100 by screen display of the display 57. The data may be output to the external storage device 59 or the recording medium 61, or printed with a printing device.

In the embodiment, based on the light receiving signal from the light receiving element 21, a light blocking determination unit that determines whether each optical axis is blocked can be configured by one of or both, for example, the optical axis sequentially-selecting circuit 25 and the processing circuit 26.

The multiple-optical-axis photoelectric sensor system 100 also includes a muting processor. The muting processor disables the light blocking determination on condition that the detection signal input from an external muting instrument changes according to a predetermined sequence with respect to all or some of the optical axes in the multiple-optical-axis photoelectric sensor SNS. The muting processor includes a muting start determination unit that starts the muting based on the output from the external muting instrument and the muting determination unit 40 (see FIG. 5) that determines the sequence of the detection signal from the muting instrument during the muting by dividing the sequence into the stages.

For example, the light blocking determination unit and muting processor, which are included in the multiple-optical-axis photoelectric sensor system 100, can be configured by the processing circuit 26 on the side of the optical receiver 2 and the processing circuit 16 on the side of the projector 1. For example, the muting processor can be configured by the personal computer 5. However, the configuration and effect of the present invention can be achieved even if the muting processor is disposed in the multiple-optical-axis photoelectric sensor SNS. The light blocking determination unit and the muting processor may be integrated in one processing circuit (control circuit). The light blocking determination unit and the muting processor may be integrated in one processing circuit (control circuit).

Figure 7:
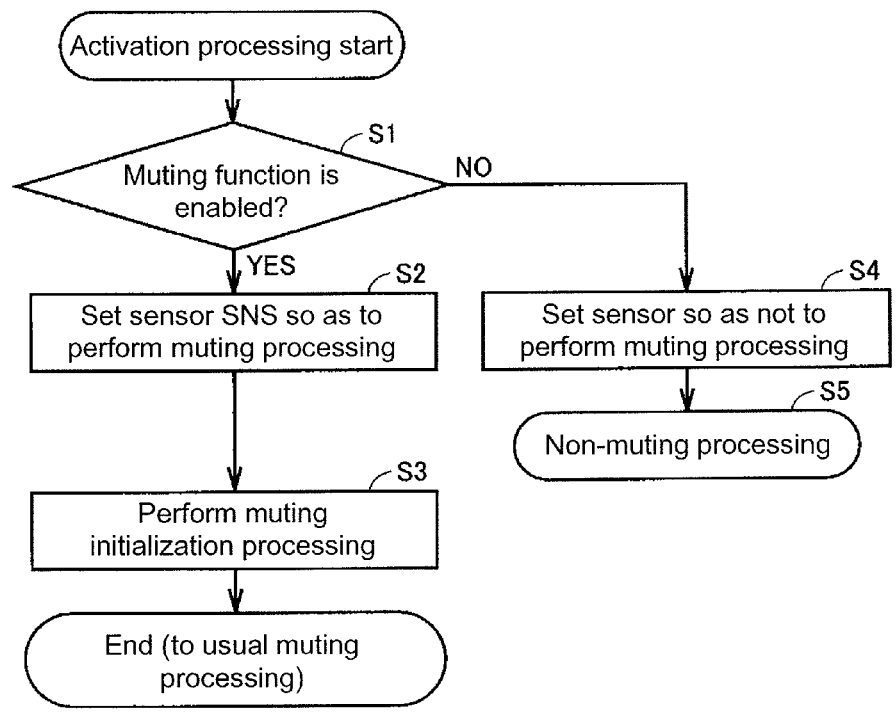
FIG. 7 is a flowchart illustrating a basic flow of activation processing performed by the multiple-optical-axis photoelectric sensor system of the embodiment.

FIG. 7 is a flowchart illustrating a basic flow of activation processing performed by the multiple-optical-axis photoelectric sensor system 100 of the embodiment. The pieces of processing illustrated in FIG. 7 and other drawings are performed by a functional block concerning the control of the multiple-optical-axis photoelectric sensor system 100. Accordingly, it is not restricted that the following processing is performed only by a specific functional block. That is, processing in each step of the flowchart can be performed by, for example, one of the control circuit 36 of the communication unit 4, the processing circuits 16 and 26, and the personal computer 5.

Referring to FIG. 7, for example, the multiple-optical-axis photoelectric sensor SNS is powered on to start the activation processing. Whether a muting function is enabled is determined (Step S1). Because whether various functions are enabled can be determined by well-known various methods, the detailed description is neglected. For example, whether various functions are enabled can be determined by referring to a setting of a switch or a parameter value stored in the device.

When the muting function is enabled (YES in Step S1), the multiple-optical-axis photoelectric sensor SNS is set so as to perform the muting processing (Step S2). When the muting function is disabled (NO in Step S1), the multiple-optical-axis photoelectric sensor SNS is set so as not to perform the muting processing (Step S4). The activation processing is ended, and then non-muting processing is performed (Step S5).

In the case that multiple-optical-axis photoelectric sensor SNS is set so as to perform the muting processing in Step S2, muting initialization processing is performed (Step S3). For example, various checks are performed according to initialization of the muting. The activation processing is ended when the muting initialization processing is ended. Then the usual muting processing is performed.

(Muting Processing)

Figure 8:
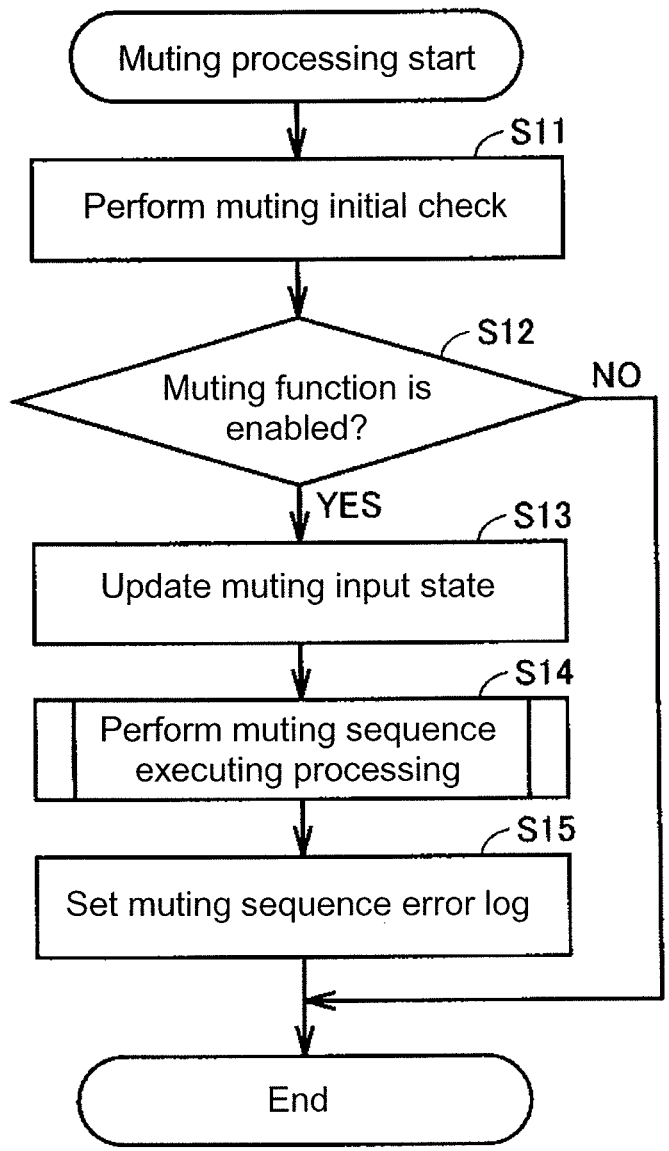
FIG. 8 is a flowchart illustrating a basic flow of muting processing performed by the multiple-optical-axis photoelectric sensor system of the embodiment.

FIG. 8 is a flowchart illustrating a basic flow of the muting processing performed by the multiple-optical-axis photoelectric sensor system 100 of the embodiment. Referring to FIG. 8, a muting initial check is performed (Step S11).

Whether the muting function is enabled is determined (Step S12). When the muting function is disabled (NO in Step S12), the muting processing is ended. When the muting function is enabled (YES in Step S12), the muting input state is updated (Step S13). For example, the states of the muting sensors A1, A2, B1, and B2 are checked.

Then the muting sequence executing processing is performed (Step S14). For example, each of the divided pieces of muting sequence processing is performed. During the muting sequence processing, pieces of data (pieces of measurement information) concerning the detection signal of the multiple-optical-axis photoelectric sensor SNS and the detection signals of the muting sensors A1, A2, B1, and B2 are collected and accumulated, and the accumulated pieces of data are analyzed. The muting sequence processing and the data accumulating and analyzing processing are described later.

Then a muting sequence error log is set (Step S15). Specifically, in the case that a muting sequence error is generated, the display of the indicating lamp and/or the recording of an error content is performed according to the muting sequence error.

(Muting Sequence Executing Processing)

Figure 9:
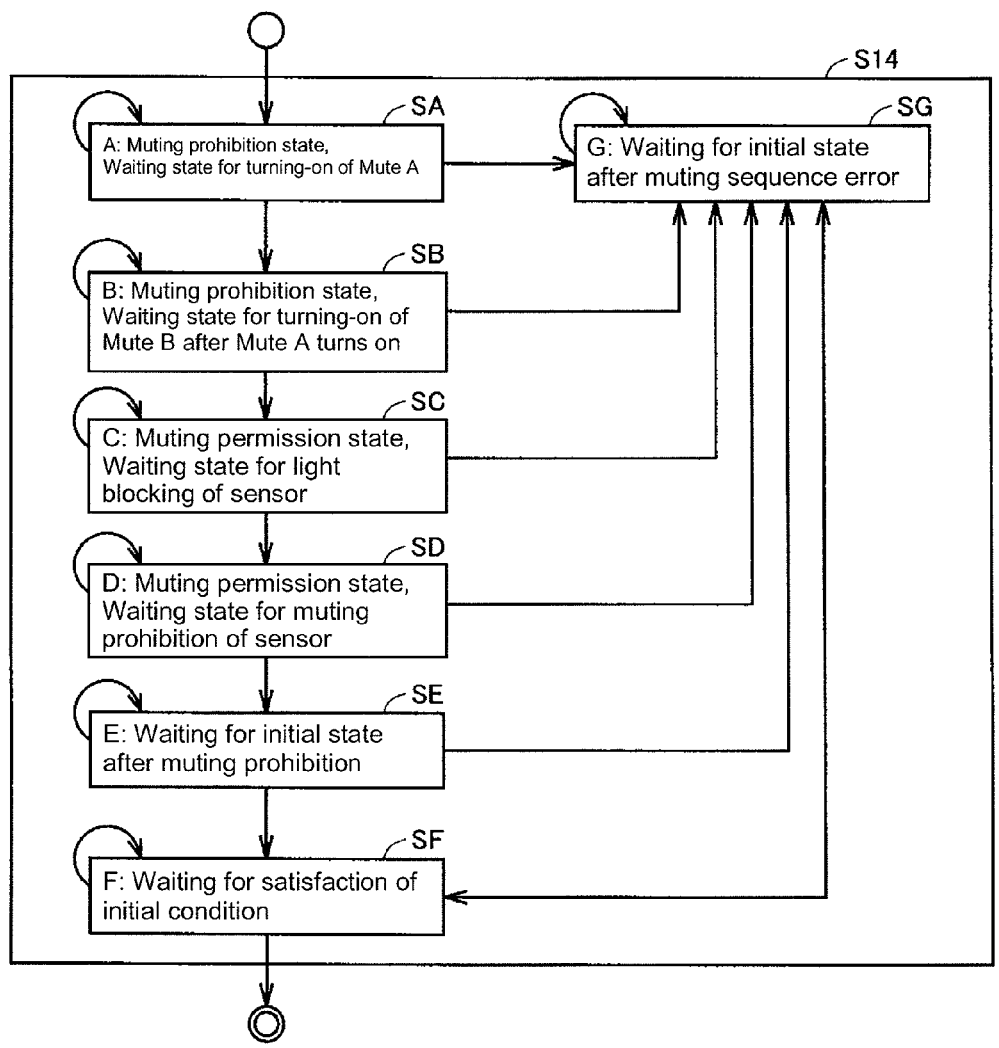
FIG. 9 is a state transition diagram illustrating muting sequence executing processing (S14) in FIG. 8.

FIG. 9 is a state transition diagram illustrating the muting sequence executing processing (S14) in FIG. 8. Referring to FIG. 9, an initial state is a waiting state for the turning-on of MUTE A (state SA) in a muting prohibition state.

When the workpiece W is detected in one (for example, muting sensor A1) of the muting sensors A1 and A2, the MUTE A turns on. Therefore, the state transitions from the state SA to a state SB. The state SB is a waiting state for the turning-on of MUTE B after the MUTE A turns on.

When the workpiece W is detected in one (for example, muting sensor B1) of the muting sensors B1 and B2, the MUTE B turns on, and the state transitions to a muting permission state. Therefore, the state transitions from the state SB to a state SC. The state SC is a waiting state for the light blocking in the multiple-optical-axis photoelectric sensor SNS after the MUTE B turns on.

When the light blocking is detected by the multiple-optical-axis photoelectric sensor SNS, the state transitions from the state SC to a state SD. The state SD is a waiting state for prohibition of the muting state.

When the workpiece W is not detected in both the muting sensors B1 and B2, the MUTE B turns off to cancel the muting state, and the state transitions to a muting prohibition state. Therefore, the state transitions from the state SD to a state SE. The state SE is a waiting state for the initial state after the muting state is canceled. Then the state transitions to a waiting state (state SF) for satisfaction of an initial condition.

In the case that the sequence error is generated in one of the states SA to SE, the current state transitions to a state SG. The state SG is a waiting state for the initial state after the sequence error is generated. Then the state transitions to the waiting state for the satisfaction of the initial condition.

(Data Accumulating and Analyzing Processing)

In the multiple-optical-axis photoelectric sensor system 100 of the embodiment, during the performance of the muting sequence executing processing in FIG. 9, the muting determination unit 40 (see FIG. 5) collects and accumulates the data (measurement information) based on the detection signal of the multiple-optical-axis photoelectric sensor SNS and the detection signals from the muting sensors A1, A2, B1, and B2.

In the embodiment, there is no limitation to the storage device in which the collected data is accumulated. For example, the data may be accumulated in one of the storage circuit 14 of the projector 1, the storage circuit 29 of the optical receiver 2, and the storage circuit 39 of the communication unit 4. Alternatively, the data may be accumulated in the external storage device 59 or recording medium 61 of the personal computer 5.

The muting determination unit 40 analyzes the data accumulated in the storage device, and presents an analysis result of the data to a user. The analysis result can be accumulated in the storage device together with the data.

In the embodiment, for example, the muting determination unit 40 can be configured by the processing circuit 26 on the side of the optical receiver 2. Alternatively, the muting determination unit 40 may be configured by, for example, one of the processing circuit 16 on the side of the projector 1, the control circuit 36 of the communication unit 4, and the personal computer 5. Thus, the configuration and effect of the present invention can be achieved even if the muting determination unit 40 is not disposed in the multiple-optical-axis photoelectric sensor SNS.

In the embodiment, for example, a presentation unit that presents the analysis result can be configured by the screen display of the display 57 in the personal computer 5. Any presentation unit can be used as long as the presentation unit can output the analysis result to the outside of the multiple-optical-axis photoelectric sensor system 100. For example, the analysis result may be printed with a printing device or output to the external storage device 59 or the recording medium 61. Alternatively, the analysis result may be output to a mobile device, a controller that is of a control device of the production facility, or a network through which production facilities are managed.

The data accumulated during the performance of the muting sequence executing processing will be described below with reference to FIGS. 10 and 11.

Figure 10:
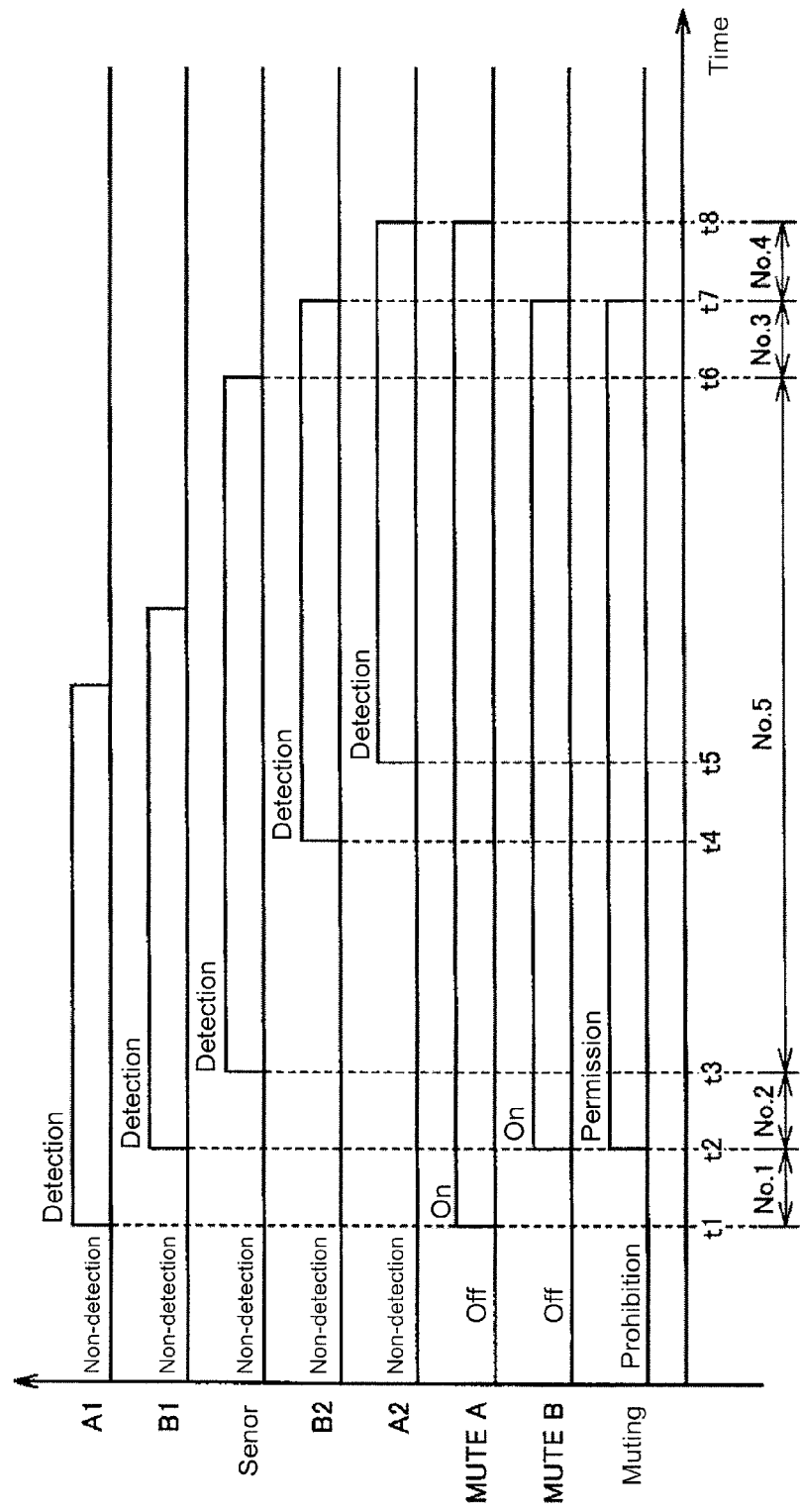
FIG. 10 is a signal waveform diagram illustrating an example of muting sequence executing processing in FIG. 9.

FIG. 10 is a signal waveform diagram illustrating an example of the muting sequence executing processing in FIG. 9. Referring to FIG. 10, before a clock time t1, the workpiece W does not reach the position of the muting sensor A1. Accordingly, the muting sensors A1, A2, B1, and B2 do not detect the workpiece W. The muting sensors A1, A2, B1, and B2 output the L-level signals. Therefore, the signal levels of the MUTE A and MUTE B are the L-level. In other words, both the MUTE A and the MUTE B are in the off state (state SA in FIG. 9).

At a clock time t1, the muting sensor A1 detects the workpiece W. Therefore, the signal output from the muting sensor A1 is changed from the L-level to the H-level. Accordingly, the signal level of the MUTE A is changed from the L-level to the H-level. In other words, the MUTE A turns on at the clock time t1 (state SB in FIG. 9).

At a clock time t2, the muting sensor B1 detects the workpiece W. Therefore, the signal output from the muting sensor B1 is changed from the L-level to the H-level. Accordingly, the signal level of the MUTE B is changed from the L-level to the H-level. In other words, the MUTE B turns on at the clock time t2 (state SC in FIG. 9).

At a clock time t2, both the MUTE A and the MUTE B turn to the on state, whereby the multiple-optical-axis photoelectric sensor system 100 turns to the muting permission state. Therefore, the muting is started at the clock time t2 (state SC in FIG. 9).

At a clock time t3, the workpiece W blocks the optical axis in the detection area LC. The detector of the multiple-optical-axis photoelectric sensor SNS detects that at least one of the optical axes is blocked in the detection area LC. Therefore, the signal output from the detector of the multiple-optical-axis photoelectric sensor SNS is changed from the "non-detection" state to the "detection" state. After the clock time t3, the state turns to the waiting state for the cancellation of the muting permission state (the waiting state for the prohibition of the muting state) (state SD in FIG. 9).

At a clock time t4, the muting sensor B2 detects the workpiece W. Therefore, the signal output from the muting sensor B2 is changed from the L-level to the H-level. Therefore, the signal level of the MUTE B is maintained at the H-level.

At a clock time t5, the muting sensor A2 detects the workpiece W. Therefore, the signal output from the muting sensor A2 is changed from the L-level to the H-level. Therefore, the signal level of the MUTE A is maintained at the H-level.

When the workpiece W passes over the position of the muting sensor A1, the muting sensor A1 ends the detection of the workpiece W, and the signal output from the muting sensor A1 is changed from the H-level to the L-level. The same holds true for the muting sensor B1.

The passage of the workpiece W through the detection area LC is completed at a clock time t6. The signal output from the multiple-optical-axis photoelectric sensor SNS is changed from the "detection" state to the "non-detection" state.

When the workpiece W passes over the position of the muting sensor B2 at a clock time t7, the muting sensor B2 ends the detection of the workpiece W, and the signal output from the muting sensor B2 is changed from the H-level to the L-level. Therefore, the signal level of the MUTE B is changed from the H-level to the L-level. In other words, the MUTE B turns off at the clock time t7. After the clock time t7, the muting permission state is canceled to turn to the muting prohibition state (state SE in FIG. 9).

When the workpiece W passes over the position of the muting sensor A2 at a clock time t8, the muting sensor A2 ends the detection of the workpiece W, and the signal output from the muting sensor A2 is changed from the H-level to the L-level. Therefore, the signal level of the MUTE A is changed from the H-level to the L-level. In other words, the MUTE A turns off at the clock time t8.

FIG. 11 is a view illustrating an example of the data accumulated through the muting sequence executing processing in FIG. 10. Referring to FIG. 11, during the muting sequence executing processing, various pieces of data concerning the muting sequence are collected and accumulated based on the detection signals of the muting sensors A1, A2, B1, and B2 and the detection signal of the multiple-optical-axis photoelectric sensor SNS.

For example, in FIG. 11, the data indicating a time until the clock time (that is, the clock time the muting sensor B1 detects the workpiece W) the MUTE B turns on since the clock time (that is, the clock time the muting sensor A1 detects the workpiece W) the MUTE A turns on is collected and accumulated as data No. 1. The time accumulated as the data No. 1 corresponds to the time from the clock time t1 to the clock time t2 in FIG. 10.

The data indicating a time until the clock time (that is, the clock time the multiple-optical-axis photoelectric sensor SNS detects the workpiece W) the detection signal of the multiple-optical-axis photoelectric sensor SNS is changed from the "non-detection" state to the "detection" state since the clock time the MUTE B turns on is collected and accumulated as data No. 2. The time accumulated as the data No. 2 corresponds to the time from the clock time t2 to the clock time t3 in FIG. 10.

The data indicating a time until the clock time (that is, the clock time the muting sensor B2 completes the detection of the workpiece W) the MUTE B turns off since the clock time (that is, the clock time workpiece W completes the passage over the detection area LC=the clock time the multiple-optical-axis photoelectric sensor SNS does not detect the workpiece W) the detection signal of the multiple-optical-axis photoelectric sensor SNS is changed from the "detection" state to the "non-detection" state is collected and accumulated as data No. 3. The time accumulated as the data No. 3 corresponds to the time from the clock time t6 to the clock time t7 in FIG. 10.

The data indicating a time until the clock time (that is, the clock time the muting sensor A2 completes the detection of the workpiece W) the MUTE A turns off since the clock time (that is, the clock time the muting sensor B2 completes the detection of the workpiece W) the MUTE B turns off is collected and accumulated as data No. 4. The time accumulated as the data No. 4 corresponds to the time from the clock time t7 to the clock time t8 in FIG. 10.

The data indicating a time until the clock time the detection signal of the multiple-optical-axis photoelectric sensor SNS is changed from the "detection" state to the "non-detection" state since the clock time the detection signal is changed from the "non-detection" state to the "detection" state is collected and accumulated as data No. 5. The time accumulated as the data No. 3 corresponds to the time from the clock time t3 to the clock time t6 in FIG. 10. This time is the time during which the workpiece W passes through the detection area LC, and is the time during which the multiple-optical-axis photoelectric sensor SNS detects the workpiece W.

Figure 12:
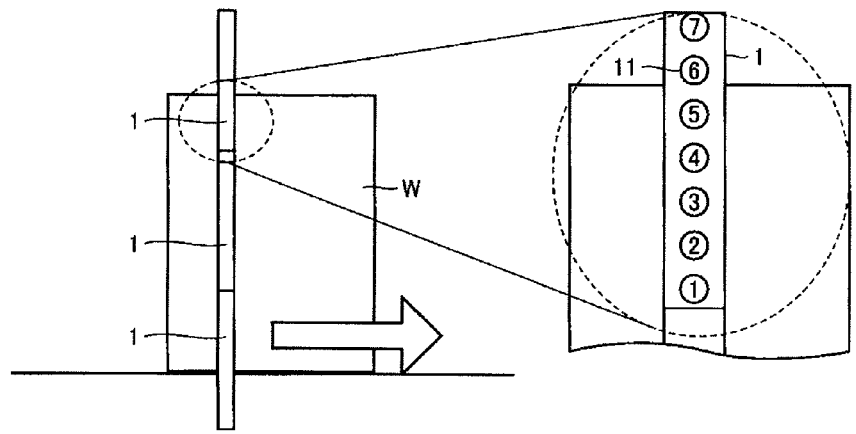
FIG. 12 is a view illustrating the data in FIG. 11.

As illustrated in FIG. 12, data No. 6 is aimed at a configuration, in which the projectors 1 of the plurality of multiple-optical-axis photoelectric sensors SNS are coupled to one another while the optical receivers 2 are coupled to one another. In FIG. 12, the three multiple-optical-axis photoelectric sensors SNS are, but not limited to this, coupled to one another. In this case, the plurality of multiple-optical-axis photoelectric sensors SNS are regarded as one multiple-optical-axis photoelectric sensor. In the case that the one multiple-optical-axis photoelectric sensor detects the workpiece W, a number identifying the multiple-optical-axis photoelectric sensor SNS (in the case of FIG. 12, the top third multiple-optical-axis photoelectric sensor SNS) located at the lowermost position in at least one multiple-optical-axis photoelectric sensor SNS actually detecting the workpiece W is accumulated as data No. 6.

Data No. 7 is data indicating the number of the optical axis located at the lowermost position in at least one optical axis blocked by the passage of the workpiece W when the one multiple-optical-axis photoelectric sensor SNS detects the workpiece W.

Data No. 8 is data indicating the number identifying the multiple-optical-axis photoelectric sensor SNS (in the case of FIG. 12, the top multiple-optical-axis photoelectric sensor SNS) located at the uppermost position in at least one multiple-optical-axis photoelectric sensor SNS actually detecting the workpiece W in the configuration in which the plurality of multiple-optical-axis photoelectric sensors SNS are coupled to one another and used as one multiple-optical-axis photoelectric sensor.

Data No. 9 is data indicating the number of the optical axis located at the uppermost position in at least one optical axis blocked by the passage of the workpiece W when the one multiple-optical-axis photoelectric sensor SNS detects the workpiece W. Referring to FIG. 12, the optical axes located at the first to fifth positions from the bottom are blocked by the passage of the workpiece W for the multiple-optical-axis photoelectric sensor SNS located at the first position from the top. The data indicating the fifth optical axis located at the uppermost position in the optical axes located at the first to fifth positions from the bottom is accumulated as the data No. 9. The pieces of data Nos. 6 and 7 indicate the upper end position of an area blocked by the workpiece W, and the pieces of data Nos. 8 and 9 indicate the lower end position of the area blocked by the workpiece W. The height of the workpiece W can be obtained based on the pieces of data Nos. 6 to 9.

Thus, during the performance of the muting sequence processing, the muting determination unit 40 collects the plurality of pieces of data indicating operation of a muting sequence based on the detection signal of the multiple-optical-axis photoelectric sensor SNS and the detection signals of the muting sensors A1, A2, B1, and B2, and accumulates the collected pieces of data in the storage device. The pieces of data accumulated in the storage device are updated at predetermined timing. For example, the pieces of data may periodically be updated at constant intervals, for example, with intervals of several hours. Alternatively, the pieces of data may be updated at time an update command is input from the outside of the multiple-optical-axis photoelectric sensor system 100.

The muting determination unit 40 analyzes the data accumulated in the storage device, and the presentation unit presents the analysis result of the data to the user. In the analysis, a variation state of the data is obtained by performing, for example, statistical processing on a predetermined amount of accumulated data. Based on the presented analysis result, the user can compare a previously-set muting sequence to the operation of the actual muting sequence. Therefore, the user can optimize the muting sequence in order to properly operate the muting function.

Figure 13A:
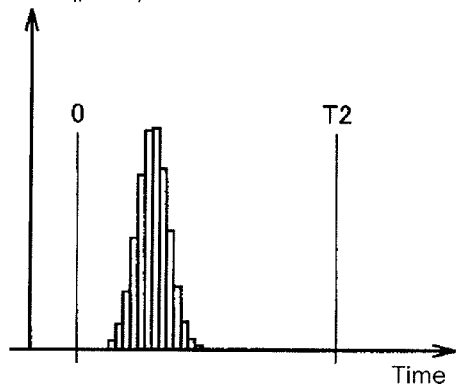
FIGS. 13A and 13B are views illustrating an example of data analyzing processing of the embodiment.

An example of the data analyzing processing of the embodiment will be described below with reference to FIGS. 13A to 14. FIG. 13A is a view illustrating a muting time distribution when a test run in which the workpiece W is conveyed on a trial basis is performed in the production facility. The "muting time" corresponds to the time until the clock time (the clock time t3 in FIG. 10) the multiple-optical-axis photoelectric sensor SNS detects the workpiece W since the clock time (the clock time t2 in FIG. 10) the MUTE B turns on, and is the time during which the data is accumulated as the data No. 2 in FIG. 11.

Referring to FIG. 13A, a variation in muting time follows a normal distribution. For example, the variation in muting time is generated by a variation in conveying speed or a vibration of the workpiece W during the conveyance of the workpiece W. Accordingly, in the muting sequence, an upper limit of the muting time is set in consideration of the variation in conveying speed or a vibration level such that the variation in conveying speed or the vibration of the workpiece W is permitted. In the case that the muting state beyond the upper limit is continued, it is determined that an object except the workpiece W invades in the detection area LC, and the operation of the production facility is stopped.

A numerical value T2 in FIG. 13A indicates an initial value of an upper limit of the muting time, and is previously set before the test run. As illustrated in FIG. 13A, in consideration of the variation in muting time, the initial value T2 is set with a margin such that the state surely turns to the muting state during the conveyance of the workpiece W. However, the muting time is unnecessarily lengthened when the margin is excessively large with respect to the variation in actual muting time. Therefore, even if the object except the workpiece W invades in the detection area LC during the muting state, there is generated a possibility that the multiple-optical-axis photoelectric sensor SNS cannot correctly detect the invasion of the object.

In the embodiment, the muting determination unit 40 analyzes the variation in actual muting time, and presents the analysis result together with the initial setting value T2 of the muting time. This enables the user to determine whether the initial setting value T2 is proper based on the actual variation. The user can also adjust the muting time to a proper value based on the presentation.

Figure 13B:
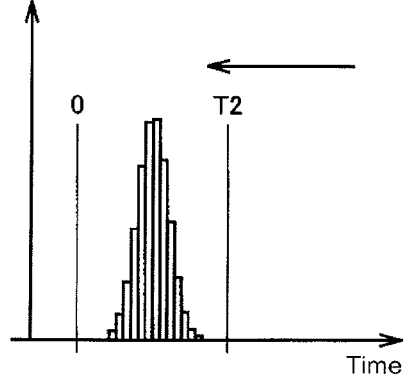

The muting determination unit 40 can decide an optimum setting value for the muting operation condition based on the analysis result. Specifically, based on the analysis result, the muting determination unit 40 optimizes a muting sequence such that a predetermined condition is satisfied. For example, the muting determination unit 40 calculates the proper muting time based on the analysis result in FIG. 13A. As illustrated in FIG. 13B, the muting determination unit 40 can present a calculation result to the user as the proper value of the muting time. In performing the optimization processing, the user can previously set desired conditions (such as a margin level) from the viewpoint of productivity and safety of the production facility.

The data accumulating and analyzing processing can be performed during not only the test run but also running of the production facility. Even if the production facility is stopped due to the generation of the muting error during the running of the production facility, the user can verify the cause of the muting error by referring to the pieces of data and analysis results accumulated in the storage device. As a result, a load of trial and error on the user can be reduced to restore the production facility in a short time from the generation of the muting error.

Figure 14:
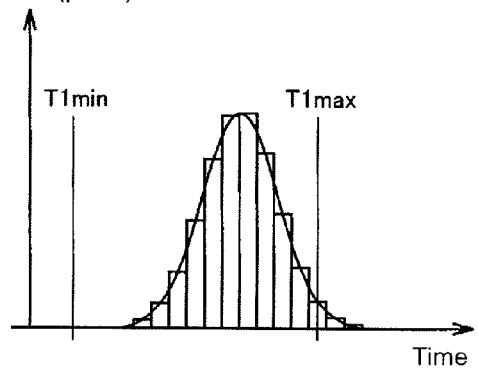
FIG. 14 is a view illustrating another example of the data analyzing processing of the embodiment.

FIG. 14 is a view illustrating a distribution of time difference (hereinafter, also referred to as a "detection time difference") in the detection operation of the muting sensor during the running of the production facility. The detection time difference means a time difference between the clock time (clock time t1 in FIG. 10) the MUTE A turns on and the clock time (clock time t2 in FIG. 10) the MUTE B turns on. That is, the detection time difference means the time difference between the clock time the muting sensor A1 detects the workpiece W and the clock time the muting sensor B1 detects the workpiece W. The detection time difference corresponds to a transit time of the workpiece W until the muting sensor B1 detects the workpiece W since the muting sensor A1 detects the workpiece W. The detection time difference depends mainly on a distance between the muting sensor A1 and the muting sensor B1 and the conveying speed of the workpiece W.

Referring to FIG. 14, a variation in detection time difference follows a normal distribution. For example, the variation in detection time difference is generated by an installation state of the muting sensor, the variation in conveying speed of the workpiece W, and the vibration of the workpiece W. In the muting sequence, a permissible range is provided in the detection time difference so as to permit the installation state of the muting sensor, the variation in conveying speed of the workpiece W, and the vibration of the workpiece W.

A numerical value T1min in FIG. 14 indicates an initial value of a lower limit in the permissible range of the detection time difference, and a numerical value T1max indicates an initial value of an upper limit in the permissible range of the detection time difference. It is necessary that the permissible range be set so as to cover the variation in detection time difference. However, the actual detection time difference ranges beyond the initial value T1max that is of the upper limit of the permissible range. Therefore, even when the workpiece W passes currently through the detection area LC, it is determined that the object except the workpiece W invades in the detection area LC, and the production facility is stopped.

The muting determination unit 40 analyzes the detection time difference of the actual muting sensors, and presents the analysis result together with the initial setting values T1min and T1max in the permissible range of the detection time difference. This enables the user to determine whether the initial setting values T1min and T1max in the permissible range are proper based on the actual variation. The user can also adjust the permissible range to have proper values based on the presentation.

Although not illustrated in FIG. 14, similarly to FIG. 13B, the muting determination unit 40 can calculate the permissible range of the proper detection time difference based on the analysis result, and present the calculation result to the user. In the example of FIG. 14, a value larger than a maximum value of the detection time difference is presented to the user as the proper value of the upper limit T1max in the permissible range. The upper limit T1max corresponds to the upper limit of the transit time of the workpiece W until the muting sensor B1 detects the workpiece W since the muting sensor A1 detects the workpiece W.

Figure 15:
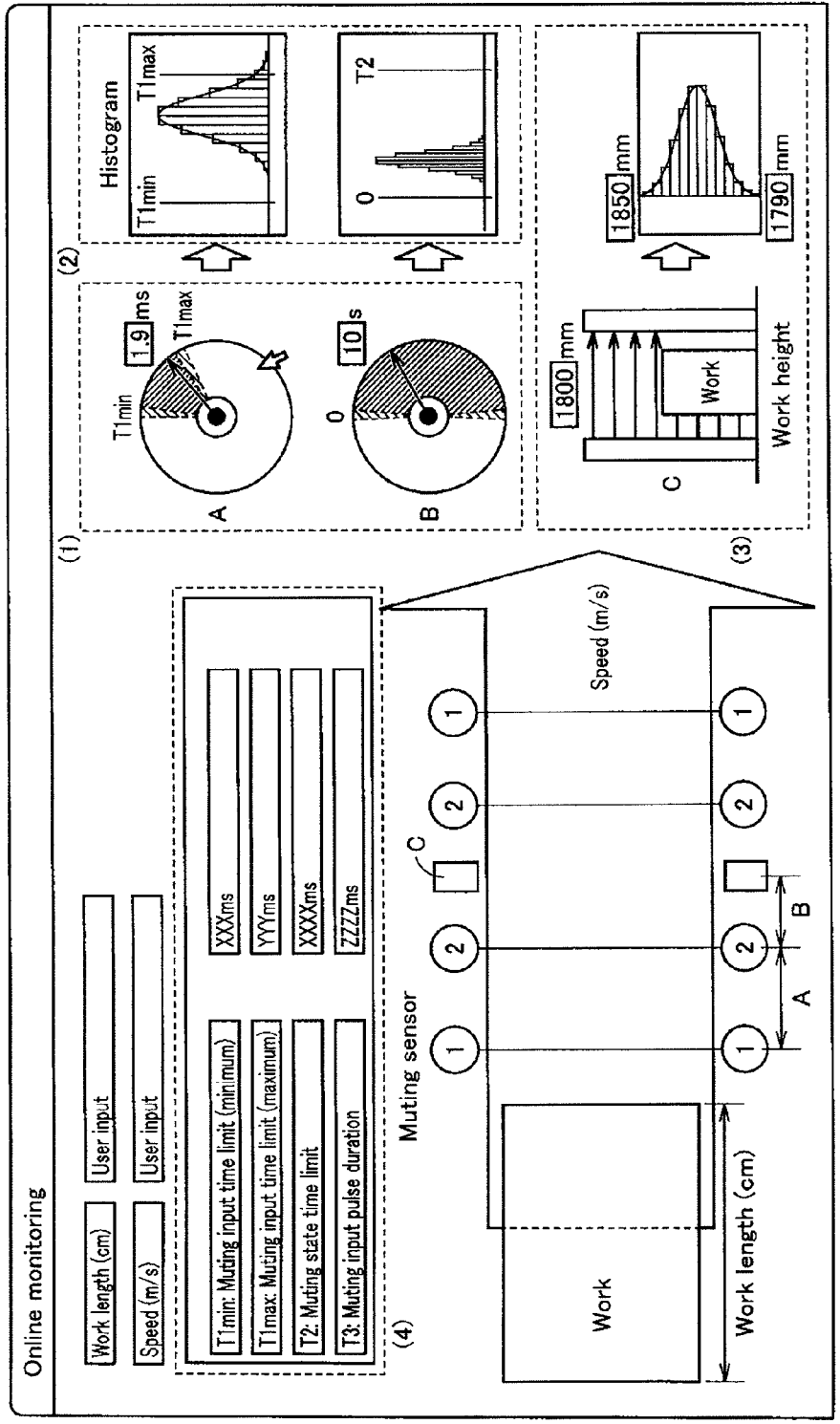
FIG. 15 is a view illustrating an example of screen display.

The analysis results in FIGS. 13A to 14 are presented to the user by, for example, the screen display of the display 57 in the personal computer 5. FIG. 15 is a view illustrating an example of the screen display.

Referring to FIG. 15, a length (Work length) in the conveying direction of the workpiece W and the conveying speed (Speed) of the workpiece W are illustrated as parameters previously set and input by the user in an upper left portion of the screen. A positional relationship among the muting sensors A1, A2, B1, and B2 and the multiple-optical-axis photoelectric sensor SNS with respect to a conveying path of the workpiece W is schematically illustrated in a lower left portion of the screen. In FIG. 15, an encircled digit "1" indicates the muting sensors A1 and A2, and an encircled digit "2" indicates the muting sensors B1 and B2. A zone A indicates a zone from the muting sensor A1 to the muting sensor B1, and a zone B indicates a zone from the muting sensor B1 to the multiple-optical-axis photoelectric sensor SNS. A character "C" surrounded by a square indicates the multiple-optical-axis photoelectric sensor SNS.

On the screen display in FIG. 15, during the performance of the muting sequence processing, real-time data is displayed based on the detection signals of the muting sensors A1, A2, B1, and B2 and the detection signals of the multiple-optical-axis photoelectric sensor SNS. By way of example, the pieces of real-time data of the detection time difference of the muting sensors and the muting time are displayed in a screen area (1). The pieces of data are displayed on the screen during the performance of the muting sequence processing, and accumulated in the storage device.

An analysis result of the data stored in the storage device is also displayed on the screen. The distribution of the detection time difference of the muting sensors and the distribution of the muting duration are displayed in a screen area (2) as an example of the analysis result. The permissible range (upper limit T1max and lower limit T1min) of the detection time difference in the current muting sequence processing is displayed together with the distribution of the detection time difference of the muting sensors. The upper limit T2 of the muting time in the current muting sequence processing is displayed together with the distribution of the muting duration.

The distribution of the height (Work height) of the workpiece W is displayed in a screen area (3) as another example of the analysis result. The height of the workpiece W can be obtained based on the area, indicated by the pieces of data Nos. 6 to 9 (see FIG. 11), where the light beam is blocked by the workpiece W. In the example of FIG. 15, a variation in height of the workpiece W follows a normal distribution. For example, the variation in height of the workpiece W is generated by the variation in conveying speed of the workpiece W or the vibration of the workpiece W during the conveyance of the workpiece W.

An optimum value that is obtained by optimizing the muting sequence based on the analysis result is also displayed in the screen display of FIG. 15. By way of example, the optimum values of the upper limit T1max and lower limit T1min, which define the permissible range of the detection time difference of the muting sensors, are displayed in a screen area (4). The optimum value of the upper limit T2 of the muting time is also displayed. The optimum value of the upper limit T3 of time during which the multiple-optical-axis photoelectric sensor SNS detects the workpiece W is also displayed. The time during which the multiple-optical-axis photoelectric sensor SNS detects the workpiece W means time during which the workpiece W passes through the detection area LC, and corresponds to the time from the clock time t3 to the clock time t6 in FIG. 10.

Thus, the real-time data, the analysis result of the data, and the optimum value based on the analysis result are displayed on the display 57 of the personal computer 5. This enables the user to easily set the muting sequence according to the desired optimum value. After setting the muting sequence by the test run, the user activates the production facility again for the purpose of confirmation. The user activates the production facility on a full scale when confirming that the muting function of the multiple-optical-axis photoelectric sensor system 100 is activated according to the set muting sequence.

(Effect of Embodiment)

According to the embodiment of the present invention, the statistical information on the muting function is presented to the user, so that the user can set the muting sequence based on the high-accuracy information. Therefore, the stop of the production facility due to the generation of the muting error can be suppressed. Additionally, the necessity of the trial and error is eliminated in start-up of the production facility, so that man-hour of start-up work can be reduced. As a result, the productivity can be improved.

In the conventional multiple-optical-axis photoelectric sensor, when the muting sequence is set, an excessive margin is provided in a muting error determination condition from the viewpoint of securing the productivity, which results in a problem in that the safety realized by the production facility is degraded. According to the embodiment of the present invention, the proper margin is set based on the actual operation of the muting sequence, so that the multiple-optical-axis photoelectric sensor system in which a balance between the productivity and the safety is established can be constructed.

OTHER EMBODIMENTS

In the multiple-optical-axis photoelectric sensor system of the present invention, the effect similar to that of the above embodiment can be obtained by the following embodiments.

(1) In the muting determination unit of the present invention, the user can set the data that is collected and accumulated during the performance of the muting sequence executing processing. For example, the user may set and input the desired data using the input unit 55 (see FIG. 6) of the personal computer 5. The muting determination unit can accumulate the data and the analysis result in the storage device, and update the data and analysis result accumulated in the storage device at predetermined timing. For example, in the storage circuits 14, 29, and 39 (see FIG. 4) having relatively small memory capacities, the data and the analysis result are accumulated at constant intervals, and the data and the analysis result are overwritten when the memory capacity is filled with the data and the analysis result. On the other hand, in the external storage device 59 and recording medium 61 (see FIG. 6) having relatively large memory capacities, all the pieces of data and analysis results are continuously updated.

(2) As to the data analysis performed by the muting determination unit of the present invention, the user can set an analysis technique and an analysis condition. In the embodiment, the configuration in which the histogram indicating the distribution state of the data is generated is illustrated as the analysis technique. Alternatively, a configuration in which a normal distribution, maximum value/minimum value, an average value, and a mode of the data are obtained may be used as the analysis technique. Alternatively, the accumulated pieces of data may directly be presented without analysis. The user can variably set the analysis interval so as to be able to recognize a trend analysis or a long-term tendency of the activation state of the muting function.

As to the analysis condition, a condition of filtering processing can be set in order to remove data indicating a clearly abnormal value in the accumulated pieces of data. The condition of the filtering processing may previously be set before the accumulation of the data is started, or the user may manually remove the abnormal value by referring to the accumulated pieces of data.

(3) By way of example the configuration in which the muting determination unit optimizes the muting sequence based on the analysis result is described in the data analysis of the embodiment. At this point, the user can set the condition that is used to decide the optimum value. In the data analysis, whether the currently-set margin is proper can be evaluated from the viewpoint of the productivity and safety. The presentation unit presents an evaluation result to the user together with the analysis result.

(4) In the muting determination unit of the present invention, the optimized muting sequence may automatically be reflected in the actual setting.

(5) In the muting determination unit of the present invention, the analysis result and the optimized muting sequence, which accumulated in the storage device, can be backed up in units of workpieces (units of detection objects). Specifically, the analysis result and the optimized muting sequence are stored in each exchange of arrangement, and the stored analysis result and muting sequence are read and used when a production apparatus conveys the workpiece having the same shape as the workpiece conveyed in the past.

(6) The multiple-optical-axis photoelectric sensor system of the present invention can be applied to an application in which a shape of the workpiece changes. Specifically, in the muting processor, a plurality of sequences can be switched and used according to the shape of the workpiece in the muting sequence executing processing. In this case, the muting determination unit can accumulate the data and the analysis result by classifying the data and the analysis result in each workpiece. The presentation unit can present the data and the analysis result by classifying the data and the analysis result in each workpiece.

(7) The multiple-optical-axis photoelectric sensor system of the present invention includes a configuration in which an abnormality is detected when the clearly abnormal value is included in the pieces of data accumulated in the storage device or when a small amount of data is accumulated. In the case that the abnormality is detected, the user can be informed of the abnormality through, for example, the indicating lamps 10 and 20 (see FIG. 1) of the multiple-optical-axis photoelectric sensor SNS.

(8) The multiple-optical-axis photoelectric sensor system of the present invention can be applied to a configuration in which the projectors 1 of the plurality of multiple-optical-axis photoelectric sensors SNS are coupled to each other while the optical receivers 2 are coupled to each other. In the configuration, the user can select whether each multiple-optical-axis photoelectric sensor SNS or the whole of the plurality of multiple-optical-axis photoelectric sensors SNS are used as a target for which the muting determination unit accumulates and analyzes the data. For example, using the input unit 55 (see FIG. 6) of the personal computer 5, the user may select the multiple-optical-axis photoelectric sensor SNS as the target of the data accumulation and analysis.

The embodiments are disclosed only by way of example, and the present invention is not limited to the disclosed embodiments. The scope of the present invention is indicated by claims, and the meanings equivalent to the claims and all the changes within the claims are included in the present invention.

The invention claimed is:

1. A multiple-optical-axis photoelectric sensor system configured to detect a detection object conveyed by a conveying device, the multiple-optical-axis photoelectric sensor system comprising:

a projector comprising a plurality of light projecting units arrayed in line;

an optical receiver comprising a plurality of light receiving units that are arranged so as to face the plurality of respective light projecting units;

a light blocking control circuit configured to make a light blocking determination whether each of a plurality of optical axes formed between the plurality of light projecting units and the plurality of light receiving units is in a light blocking state; and a muting processor configured to temporarily disable the light blocking determination on condition that a detection signal input from an external muting instrument changes according to a predetermined sequence, wherein the muting processor is configured to perform operations comprising:

starting muting based on an output from the muting instrument; and determining the sequence of the detection signal from the muting instrument during the muting by dividing the sequence into a plurality of stages, accumulating measurement information acquired in each stage, and analyzing the accumulated measurement information, and deciding an optimum setting value for a muting operation condition based on an analysis result of the accumulating.

2. The multiple-optical-axis photoelectric sensor system according to claim 1, wherein the operations further comprise accumulating the analysis result together with the measurement information, and updating the accumulated measurement information and analysis result at predetermined timing.

3. The multiple-optical-axis photoelectric sensor system according to claim 2, wherein the operations further comprise accumulating the optimum setting value together with the measurement information and the analysis result, and backing up the analysis result and the optimum setting value in units of detection objects.

4. The multiple-optical-axis photoelectric sensor system according to claim 1, further comprising:

an input configured to receive a setting input from a user, wherein the input receives a setting concerning the measurement information accumulated.

5. The multiple-optical-axis photoelectric sensor system according to claim 4, wherein the input receives a setting concerning an analysis technique or an analysis condition.

6. The multiple-optical-axis photoelectric sensor system according to claim 4, wherein the input receives a setting concerning a condition that is used by the muting processor to decide the optimum setting value.

7. The multiple-optical-axis photoelectric sensor system according to claim 4, wherein the plurality of projectors are coupled to each other in a direction perpendicular to the optical axis, the plurality of optical receivers are coupled to each other in the direction perpendicular to the optical axis so as to face the plurality of respective projectors, and
the input receives selection of at least one set of the projector and the optical receiver as a target.

8. The multiple-optical-axis photoelectric sensor system according to claim 1, further comprising:
an interface configured to present the analysis result or the optimum setting value to a user.

9. The multiple-optical-axis photoelectric sensor system according to claim 1, wherein the muting processor automatically reflects the optimum setting value in the sequence.

10. The multiple-optical-axis photoelectric sensor system according to claim 1, wherein the muting processor is configured to switch and use the plurality of sequences according to a shape of a detection object, and
the operations further comprise accumulating and analyzing the measurement information in each detection object.

11. The multiple-optical-axis photoelectric sensor system according to claim 10, further comprising:
an input configured to receive a setting input from a user; and
an interface configured to present the analysis result or the optimum setting value to the user,
wherein the input receives a setting concerning a type of the detection object presented by the interface.

12. The multiple-optical-axis photoelectric sensor system according to claim 1, further comprising:
a detector configured to detect an abnormality in the measurement information accumulated during the operations and inform a user of the abnormality.

13. The multiple-optical-axis photoelectric sensor system according to claim 1, wherein the operations further comprise analyzing a variation of the accumulated measurement information.

14. A method for controlling a multiple-optical-axis photoelectric sensor system configured to detect a detection object conveyed by a conveying device,
the multiple-optical-axis photoelectric sensor system comprising:
a projector comprising a plurality of light projecting units arrayed in line; and
an optical receiver comprising a plurality of light receiving units that are arranged so as to face the plurality of respective light projecting units,
the method comprising:
making a light blocking determination as to whether each of a plurality of optical axes formed between the plurality of light projecting units and the plurality of light receiving units is in a light blocking state; and
performing muting in order to temporarily disable the light blocking determination on condition that a detection signal input from an external muting instrument changes according to a predetermined sequence,
wherein the performing muting comprises:
starting the muting based on an output from the muting instrument;
determining the sequence of the detection signal from the muting instrument during the muting by dividing the sequence into a plurality of stages;
accumulating measurement information acquired in each stage, and analyzing the accumulated measurement information; and
deciding an optimum setting value for a muting operation condition based on an analysis result of the measurement information.

15. An apparatus configured to detect a detection object conveyed by a conveying device,
the apparatus comprising:
a processor;
a projector comprising a plurality of light projecting units arrayed in line; and
an optical receiver comprising a plurality of light receiving units that are arranged so as to face the plurality of respective light projecting units,
the processor configured to execute operations comprising:
making a light blocking determination as to whether each of a plurality of optical axes formed between the plurality of light projecting units and the plurality of light receiving units is in a light blocking state; and
performing muting in order to temporarily disable the light blocking determination on condition that a detection signal input from an external muting instrument changes according to a predetermined sequence,
wherein, in the performing muting, the processor executes operations of:
starting the muting based on an output from the muting instrument;
determining the sequence of the detection signal from the muting instrument during the muting by dividing the sequence into a plurality of stages;
accumulating measurement information acquired in each stage, and analyzing the accumulated measurement information; and
deciding an optimum setting value for a muting operation condition based on an analysis result of the measurement information.

16. A non-transitory processor-readable recording medium in which a program for controlling a multiple-optical-axis photoelectric sensor system configured to detect a detection object conveyed by a conveying device is recorded,
wherein the multiple-optical-axis photoelectric sensor system comprises:
a projector comprising a plurality of light projecting units arrayed in line; and
an optical receiver comprising a plurality of light receiving units that are arranged so as to face the plurality of respective light projecting units,
the program causing a processor to execute operations of:
making a light blocking determination as to whether each of a plurality of optical axes formed between the plurality of light projecting units and the plurality of light receiving units is in a light blocking state; and
performing muting in order to temporarily disable the light blocking determination on condition that a detection signal input from an external muting instrument changes according to a predetermined sequence,
in the performing muting, the program causes the processor to execute operations of:
starting the muting based on an output from the muting instrument;
determining the sequence of the detection signal from the muting instrument during the muting by dividing the sequence into a plurality of stages;
accumulating measurement information acquired in each stage, and analyzing the accumulated measurement information; and
deciding an optimum setting value for a muting operation condition based on an analysis result of the measurement information.

* * * * *

UNITED STATES PATENT AND TRADEMARK OFFICE
CERTIFICATE OF CORRECTION

PATENT NO. : 9,869,794 B2  
APPLICATION NO. : 14/625989  
DATED : January 16, 2018  
INVENTOR(S) : Keisaku Kikuchi et al.

Page 1 of 1

It is certified that error appears in the above-identified patent and that said Letters Patent is hereby corrected as shown below:

On the Title Page

Inventors (Line 4), please change "Kyto" to -- Kyoto --.

Signed and Sealed this
Second Day of October, 2018

Andrei Iancu
*Director of the United States Patent and Trademark Office*